US012771504B2

(12) United States Patent
Zhao

(10) Patent No.: US 12,771,504 B2
(45) Date of Patent: Oct. 20, 2026

(54) METHOD FOR TRANSMITTING TEMPORARY REFERENCE SIGNAL AND COMMUNICATION DEVICE, AND STORAGE MEDIUM

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 287 days.

(21) Appl. No.: 18/691,511

(22) PCT Filed: Sep. 17, 2021

(86) PCT No.: PCT/CN2021/119165

§ 371 (c)(1),
(2) Date: Mar. 13, 2024

(87) PCT Pub. No.: WO2023/039860

PCT Pub. Date: Mar. 23, 2023

(65) Prior Publication Data

US 2024/0405938 A1 Dec. 5, 2024

(51) Int. Cl.
*H04L 5/00* (2006.01)

(52) U.S. Cl.
CPC .......... *H04L 5/0048* (2013.01); *H04L 5/0005* (2013.01)

(58) Field of Classification Search
CPC .... H04L 5/0048; H04L 5/0005; H04L 5/0053
See application file for complete search history.

(56) References Cited

U.S. PATENT DOCUMENTS 12,395,266 B2 * 8/2025 Liu ....................... H04L 1/0023
2020/0169364 A1 5/2020 Hao et al.
2021/0028900 A1 1/2021 Manolakos et al.

FOREIGN PATENT DOCUMENTS

CN 109150424 A 1/2019
CN 110662255 A 1/2020
CN 110691389 A 1/2020
CN 110710129 A 1/2020
CN 111386669 A 7/2020
WO 2020024756 A1 2/2020
WO 2020143689 A1 7/2020

OTHER PUBLICATIONS

Nokia et al. "On low latency Scell activation" 3GPP TSG RAN Wgi #105 e-Meeting, R1-2104187, May 27, 2021 (May 27, 2021).
Huawei et al. "Discussion on efficient activation/de-activation mechanism for SCells" 3GPP TSG RAN WGI Meeting #106-e E-meeting, RI-2106473, Aug. 27, 2021 (Aug. 27, 2021).

* cited by examiner

*Primary Examiner* — Diane D Mizrahi
(74) *Attorney, Agent, or Firm* — Volpe Koenig

(57) ABSTRACT

A method, communication device, and computer readable medium for improving the reliability of a wireless communication network. The reliability is improved by: according to a resource conflict result, determining a transmission resource configured to receive a third temporary reference signal (RS) according to a resource conflict result, where the resource conflict result includes a result that a conflict or no conflict occurs between a transmission resource determined based on a first temporary RS burst and an unavailable resource.

20 Claims, 12 Drawing Sheets

METHOD FOR TRANSMITTING TEMPORARY REFERENCE SIGNAL AND COMMUNICATION DEVICE, AND STORAGE MEDIUM

CROSS REFERENCE TO RELATED APPLICATION

The present application is a U.S. National Stage of International Application No. PCT/CN2021/119165, filed on Sep. 17, 2021, the contents of all of which are incorporated herein by reference in its entirety for all purposes.

BACKGROUND OF THE INVENTION

In communication networks, a temporary reference signal (temporary RS) is defined in order to speed up the activation or deactivation process of a secondary cell (SCell). A base station triggers the transmission of a temporary reference signal in the activation process of the SCell. In this way, a terminal can perform automatic gain control (AGC) and/or time-frequency domain tracking based on the temporary reference signal, so there is no need to perform AGC adjustment and/or time-frequency domain tracking based on a system resource block (SSB) after an SSB measurement timing configuration (SMTC) cycle.

SUMMARY OF THE INVENTION

According to a first aspect of examples of the disclosure, a method for transmitting a temporary reference signal is provided. The method is performed by a terminal, and includes determining a transmission resource configured to receive a third temporary reference signal (RS) according to a resource conflict result, where the resource conflict result includes a result that a conflict or no conflict occurs between a transmission resource determined based on a first temporary RS burst and an unavailable resource.

According to a second aspect of the disclosure, a method for transmitting a temporary reference signal is provided. The method is performed by a base station, and includes determining a transmission resource configured to send a third temporary RS according to a resource conflict result, where the resource conflict result includes a result that a conflict or no conflict occurs between a transmission resource determined based on a first temporary RS burst and an unavailable resource.

According to a third aspect of the disclosure, a communication device is provided. The communication device includes a processor and a memory configured to store a processor executable instruction. The processor is configured to implement the method according to any one of the examples of the disclosure when operating the executable instruction.

According to a fourth aspect of examples of the disclosure, a non-transitory computer storage medium is provided. The non-transitory computer storage medium stores a computer-executable program, and when executed by a processor, the executable program implements the method according to any one of the examples of the disclosure.

DETAILED DESCRIPTION OF THE INVENTION

Description will be made in detail to examples here, instances of which are illustrated in the accompanying drawings. When the following description relates to the accompanying drawings, the same numbers in different accompanying drawings refer to the same or similar elements unless otherwise indicated. Embodiments described in the following examples do not represent all embodiments consistent with the examples of the disclosure. On the contrary, they are merely instances of apparatuses and methods consistent with some aspects of the examples of the disclosure as described in detail in the appended claims.

The term used in the examples of the disclosure is to describe particular examples merely and is not intended to limit the examples of the disclosure. As used in the examples and the appended claims of the disclosure, singular forms "a," "an," and "the" are intended to include plural forms as well, unless otherwise clearly indicated in the context. It should be understood that the term "and/or" as used here refers to and encompasses any or all possible combinations of one or more of the items listed in the associated list.

It should be understood that although the terms of first, second, third, etc., may be employed in the examples of the disclosure to describe various information, such information should not be limited to these terms. These terms are merely used to distinguish the same type of information from each other. For example, first information may also be referred to as second information, and similarly, second information may also be referred to as first information, without departing from the scope of the examples of the disclosure. The word "if," as used herein, may be construed to mean "at the time of," "when," or "in response to determining," depending on the context.

For purposes of brevity and ease of understanding, the term "greater than" or "less than" is used here to characterize a size relation. But as will be understood by those skilled in the art, the term "greater than" also encompasses the meaning of "greater than or equal to," and "less than" also encompasses the meaning of "less than or equal to."

In communication networks, the terminal can perform automatic gain control (AGC) and/or time-frequency domain tracking based on the temporary reference signal. When the temporary reference signal is transmitted, a resource conflict occurs. This may lead to a failure in transmission of the temporary reference signal and thus to poor reliability of transmission of the temporary reference signal.

The disclosure relates to, but is not limited to, the technical field of radio communication, and in particular relates to a method for transmitting a temporary reference signal, a communication device, and a storage medium.

Figure 1:
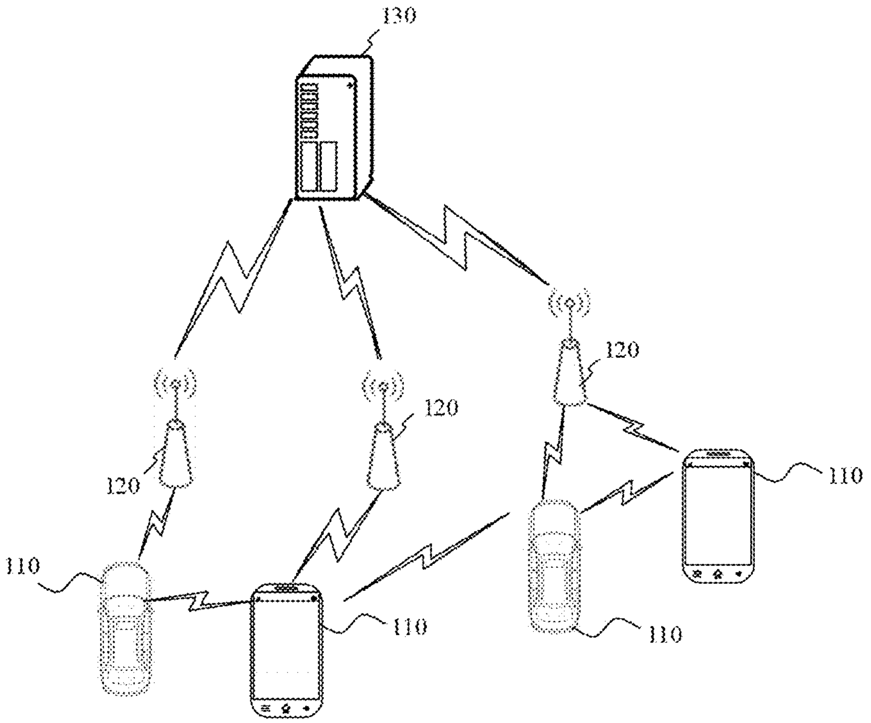
FIG. 1 is a schematic structural diagram of a radio communication system according to an example.

With reference to FIG. 1, a schematic structural diagram of a radio communication system according to an example of the disclosure is shown. As shown in FIG. 1, the radio communication system is a communication system based on a mobile communication technology. The radio communication system may include several user devices 110 and several base stations 120.

The user devices 110 may be devices that provide speech and/or data connectivity for a user. The user device 110 may communicate with one or more core networks by means of a radio access network (RAN), and the user device 110 may be an Internet of Things user device, for example, a sensor device, a mobile telephone, and a computer having an Internet of Things user device, for example, may be a stationary, portable, pocket-sized, hand-held, computer-built, or vehicle-mounted apparatus, for example, a station (STA), a subscriber unit, a subscriber station, a mobile station, a mobile, a remote station, an access point, a remote terminal, an access terminal, a user terminal, a user agent, a user device, or user equipment. Alternatively, the user device 110 may be a device of an unmanned aerial vehicle. Alternatively, the user device 110 may be an in-vehicle device, for example, an electronic control unit with a radio communication function, or a radio user device to which an electronic control unit is externally connected. Alternatively, the user device 110 may be a roadside device, for example, a street lamp, a signal lamp, another roadside device, etc., with the radio communication function.

The base station 120 may be a network side device in the radio communication system. The radio communication system may be the 4th generation mobile communication (4G) system, also referred to as a long term evolution (LTE) system; and alternatively, the radio communication system may also be a 5G system, also referred to as a new radio (NR) system or a 5G NR system. Alternatively, the radio communication system may also be a next generation system consecutive to the 5G system. An access network in the 5G system may be referred to as a new generation-radio access network (NG-RAN).

The base station 120 may be an evolved Node B (eNB) used in a 4G system. Alternatively, the base station 120 may also be a next-generation Node B (gNB) using a central distributed architecture in a 5G system. When the base station 120 uses the central distributed architecture, it typically includes a central unit (CU) and at least two distributed units (DU). The central unit is provided with protocol stacks of a packet data convergence protocol (PDCP) layer, a radio link control (RLC) layer, and a media access control (MAC) layer; and each distributed unit is provided with a protocol stack of a physical (PHY) layer. Examples of the disclosure are not limited to the specific implementation modes of the base station 120.

A radio connection may be established between the base stations 120 and the user devices 110 by means of radio air interfaces. In different embodiments, the radio air interface is a radio air interface based on a 4th generation mobile communication network technology (4G) standard; alternatively, the radio air interface is a radio air interface based on a 5th generation mobile communication network technology (5G) standard, for example, the radio air interface is a new radio; and alternatively, the radio air interface may also be a radio air interface based on a 5G-based next generation mobile communication network technology standard.

In some examples, an end-to-end (E2E) connection may also be established between the user devices 110, for example, vehicle-to-vehicle (V2V) communication, vehicle-to-infrastructure (V2I) communication, vehicle-to-pedestrian (V2P) communication, etc., of vehicle-to-everything (V2X) communication.

The above user device may be considered as the terminal of the following examples.

In some examples, the above radio communication system may further include a network management device 130.

The several base stations 120 are each connected to the network management device 130. The network management device 130 may be a core network device in the radio communication system, for example, the network management device 130 may be a mobility management entity (MME) in an evolved packet core (EPC). Alternatively, the network management device may be another core network device, for example, a serving gateway (SGW), a public data network gateway (PGW), a policy and charging rules function (PCRF), a home subscriber server (HSS), etc. The examples of the disclosure do not limit the implementation form of the network management device 130.

In order to facilitate understanding by those skilled in the art, the examples of the disclosure enumerate a plurality of embodiments to clearly describe the technical solutions of the examples of the disclosure. Certainly, those skilled in the art may understand that the plurality of examples provided in the examples of the disclosure may be executed independently, may be executed together with the methods of other examples in the examples of the disclosure, or may be executed together with some methods of other related arts independently or in combination, which are not limited to the examples of the disclosure.

In order to better understand the technical solutions disclosed in the examples of the disclosure, an application scene of temporary reference signal (RS) transmission is described.

In an example, the temporary RS multiplexes a time-frequency domain structure of a current tracking reference signal (TRS), that is, one temporary RS burst includes four orthogonal frequency division multiplexing (OFDM) symbols on two consecutive slots.

In an example, when a terminal needs to perform automatic gain control (AGC) adjustment and time-frequency domain tracking according to two temporary RS bursts separately, a time interval needs to be defined between the two temporary RS bursts, so as to guarantee that the terminal side has enough time to perform corresponding operations. In an example, a value of the time interval may be 2 slots or 2 ms.

It should be noted that for a time division duplexing (TDD) cell, not all slots can be configured for downlink transmission according to cell configuration. For example, uplink OFDM symbols in uplink slots or special slots can only be configured for uplink transmission. On the other hand, in a new radio system, a reserved resource may be configured for a downlink frequency band or a downlink slot for future system expansion. The reserved resource cannot be configured for transmitting a temporary RS. Thus, when the temporary RS is in conflict with the uplink OFDM symbol or the reserved resource, how to transmit the temporary RS is a problem that needs to be considered.

Figure 2:
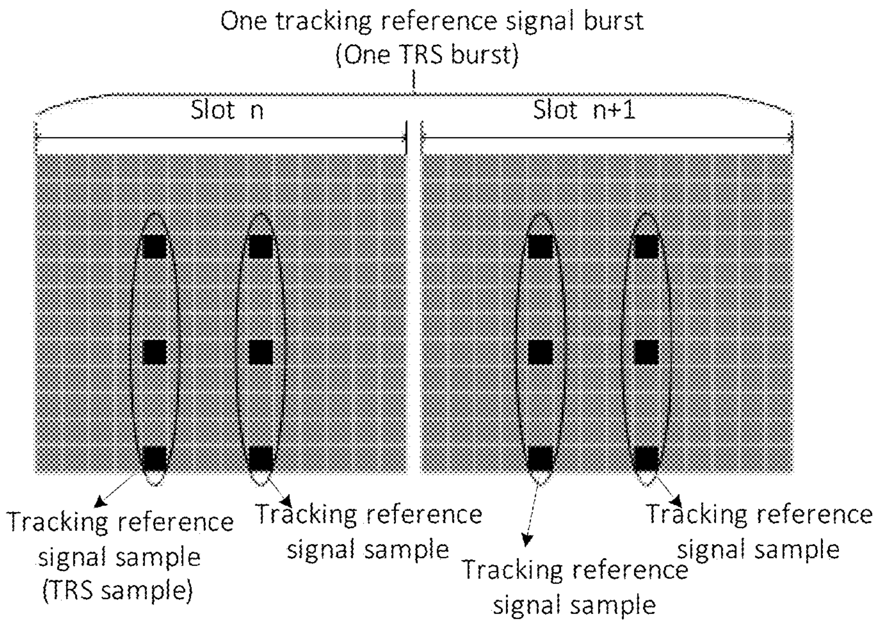
FIG. 2 is a schematic diagram of a tracking reference signal burst according to an example.

In an example, an RS burst of the TRS includes one or two consecutive slots, and each slot includes two RS samples. Here, a time-frequency domain transmission resource of the TRS in one slot is configured by radio resource control (RRC). With FRI as an example, FIG. 2 shows a mode within one RS burst. The distribution density of the RS of the TRS is fixed, and single-port transmission is adopted.

In an example, in order to speed up the activation process of a secondary cell (SCell), a temporary RS is introduced, and a physical structure of the temporary RS is determined to multiplex the structure of the current TRS. Considering that the temporary RS needs to complete AGC adjustment and time-frequency domain tracking, two temporary RS bursts need to be introduced in some scenes. In an example, a certain time interval needs to be satisfied between two temporary RS bursts, for example, 2 ms or 2 slots, and each temporary RS burst needs to include four RS samples.

In a scene example, for a TDD cell, the network side needs to configure or define the corresponding TDD uplink and downlink slot structures. For example, DDSUUDDSUU, DUDU, DSUDD, etc. A temporary RS can only be transmitted on a downlink symbol of a downlink slot or a special slot. When some or all symbols included in the temporary RS burst are in conflict with an uplink symbol, how to send and receive the temporary RS is a problem that needs to be considered.

In another scene example, a network side in a new radio system may configure a reserved resource according to specific requirements, and the reserved resource cannot be configured for transmission of data channels. If the temporary RS is configured or transmitted on the reserved resource, strong interference may be caused, which deteriorates the use effect of the temporary RS. When the temporary RS is in conflict with the reserved resource, how to send and receive the temporary RS is a problem that needs to be considered.

In another scene example, for a scene where a new radio (NR) system and an LTE system coexist on the same frequency, if a temporary RS is in conflict with a cell-specific reference signal (CRS) on resources, the temporary RS receives persistent CRS interference. How to send and receive a temporary RS is a problem that needs to be considered.

Figure 3:
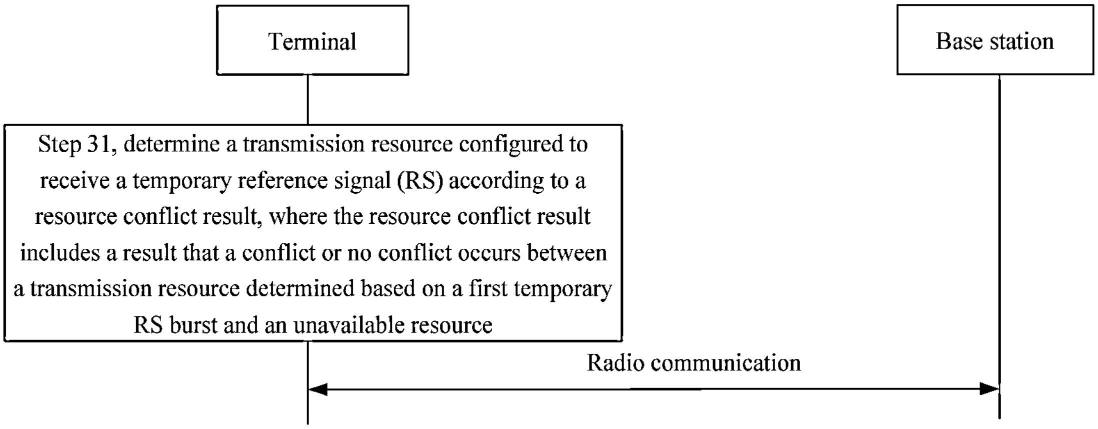
FIG. 3 is a flowchart of a method for transmitting a temporary reference signal according to an example.

As shown in FIG. 3, the example provides a method for transmitting a temporary reference signal. The method is performed by a terminal, and includes Step 31.

In Step 31, the terminal determines a transmission resource configured to receive the temporary reference signal (RS) according to a resource conflict result, where the resource conflict result includes a result that a conflict or no conflict occurs between a transmission resource determined based on a first temporary RS burst and an unavailable resource.

Here, the transmission resource configured to receive the temporary RS indicates a transmission resource configured to receive a third temporary RS. The transmission resource determined based on the first temporary RS burst is configured to transmit a temporary RS.

Here, the terminal may be, but is not limited to, a mobile phone, a tablet personal computer, a wearable device, a vehicle-mounted terminal, a road side unit (RSU), a smart home terminal, an industrial sensing device, and/or a medical device, etc. For example, the smart home terminal may include a camera, a temperature collection device, a brightness collection device, etc.

Here, the base station involved in the disclosure may be various types of base stations, for example, a base station of a 3rd generation mobile communication (3G) network, a base station of a 4th generation mobile communication (4G) network, a base station of a 5th generation mobile communication (5G) network, or other evolved base stations.

Here, the unavailable resource includes one or more of the following: an uplink symbol resource for uplink transmission; an uplink slot resource for uplink transmission; a resource configured to transmit a cell-specific reference signal (CRS); a resource configured to transmit an SSB; and a reserved resource preconfigured by a network.

Here, it should be noted that the resource in the disclosure may be a time domain resource and/or a frequency domain resource. The resource may be determined according to a specific application scene, which is not limited here. For example, the uplink slot resource configured for uplink transmission is a time domain resource, and resources configured to transmit a cell-specific reference signal (CRS) are a time domain resource and a frequency domain resource. Moreover, the transmission resources in the disclosure also have the above resource features.

Here, a conflict between the transmission resource determined based on the first temporary RS burst and the unavailable resource may be an overlap in time domain positions and/or frequency domain positions between the transmission resource determined based on the first temporary RS burst and the unavailable resource. Here, no conflict between the transmission resource determined based on the first temporary RS burst and the unavailable resource may be no overlap in time domain positions and/or frequency domain positions between the transmission resource determined based on the first temporary RS burst and the unavailable resource. Here, the transmission resource is a resource for transmitting an RS.

In an example, a terminal receives indication information sent by a base station. The indication information at least indicates a first temporary RS burst configured to activate an SCell. The indication information may be sent by means of higher-layer signaling. For example, the indication information is sent through radio resource control (RRC) signaling. It should be noted that the indication information may also implement dynamic indication by a network through other signaling. The terminal performs resource comparison on the transmission resource determined according to the first temporary RS burst and the unavailable resource, and obtains a resource conflict result. The resource conflict result includes a result that a conflict or no conflict occurs between a transmission resource determined based on a first temporary RS burst and an unavailable resource. It is determined, in response to determining that no conflict occurs between the transmission resource determined based on the first temporary RS burst and the unavailable resource, that the transmission resource configured to receive the third temporary RS is the transmission resource determined based on the first temporary RS burst; and alternatively, it is determined, in response to determining that a conflict occurs between the transmission resource determined based on the first temporary RS burst and the unavailable resource, that the transmission resource configured to receive the third temporary RS is a transmission resource determined based on a second temporary RS burst. The second temporary RS burst is a burst determined according to the first temporary RS burst. The terminal receives the temporary RS by using the transmission resource configured to receive the third temporary RS. The terminal performs AGC adjustment and/or time-frequency domain tracking by using the received temporary RS.

In another example, the terminal determines a first temporary RS burst configured for SCell activation according to preconfigured information or default configuration information. The terminal performs resource comparison on the transmission resource determined according to the first temporary RS burst and the unavailable resource, and obtains a resource conflict result. The resource conflict result includes a result that a conflict or no conflict occurs between a transmission resource determined based on a first temporary RS burst and an unavailable resource. It is determined, in response to determining that no conflict occurs between the transmission resource determined based on the first temporary RS burst and the unavailable resource, that the transmission resource configured to receive the third temporary RS is the transmission resource determined based on the first temporary RS burst; and alternatively, it is determined, in response to determining that a conflict occurs between the transmission resource determined based on the first temporary RS burst and the unavailable resource, that the transmission resource configured to receive the third temporary RS is a transmission resource determined based on a second temporary RS burst. The second temporary RS burst is a burst determined according to the first temporary RS burst. The terminal receives the temporary RS by using the transmission resource configured to receive the third temporary RS. The terminal performs AGC adjustment and/or time-frequency domain tracking by using the received temporary RS.

Here, the second temporary RS burst may be a burst determined after the first temporary RS burst is shifted overall in time domain and/or frequency domain. Alternatively, the second temporary RS burst may be a burst determined after a resource for transmitting a temporary RS in the first temporary RS burst is shifted in the time domain and/or frequency domain.

In the example of the disclosure, a transmission resource configured to receive the temporary reference signal (RS) is determined according to a resource conflict result, where the resource conflict result includes a result that a conflict or no conflict occurs between a transmission resource determined based on a first temporary RS burst and an unavailable resource. Here, since the transmission resource configured to receive a third temporary RS is determined according to a result that a conflict or no conflict occurs between a transmission resource determined based on a first temporary RS burst and an unavailable resource, the transmission resource configured to receive a third temporary RS can be adapted to the resource conflict result. That is, when a conflict occurs, the transmission resource having the conflict does not have to be used. Compared with a manner of receiving a temporary RS by using a transmission resource in conflict with an unavailable resource, the disclosure can reduce conflicts with an unavailable resource, and the reliability of temporary RS transmission can be improved.

It should be noted that those skilled in the art may understand that the method provided in the examples of the disclosure may be executed independently, or may be executed together with some methods in the examples of the disclosure, or some methods in the related art.

Figure 4:
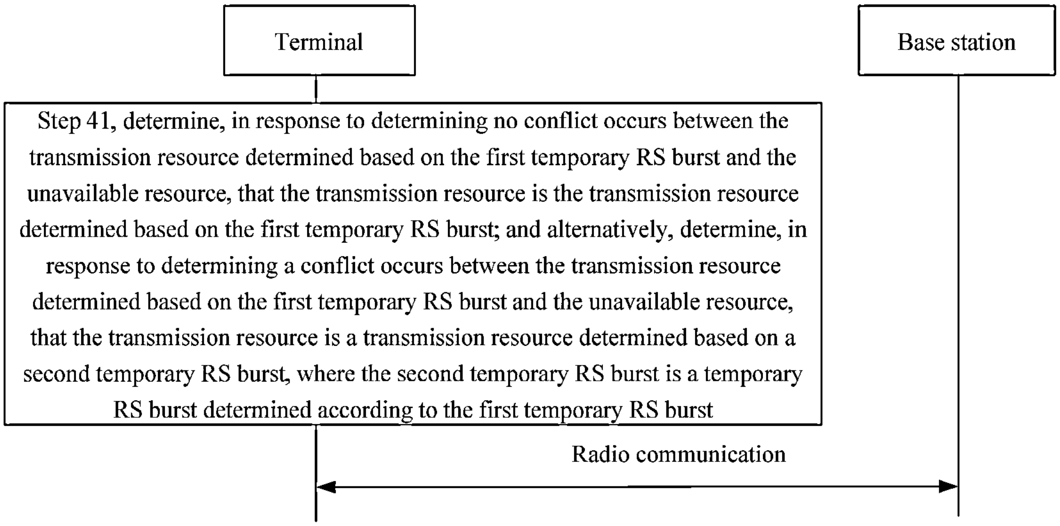
FIG. 4 is a flowchart of a method for transmitting a temporary reference signal according to an example.

As shown in FIG. 4, the example provides a method for transmitting a temporary reference signal. The method is performed by a terminal, and includes Step 41.

In Step 41, the terminal either determines, in response to determining that no conflict occurs between the transmission resource determined based on the first temporary RS burst and the unavailable resource, that the transmission resource is the transmission resource determined based on the first temporary RS burst; or determines, in response to determining that a conflict occurs between the transmission resource determined based on the first temporary RS burst and the unavailable resource, that the transmission resource is a transmission resource determined based on a second temporary RS burst, where the second temporary RS burst is a temporary RS burst determined according to the first temporary RS burst.

In an example, the transmission resource determined based on the first temporary RS burst is configured to transmit a temporary RS. It is determined that no conflict occurs between the transmission resource determined based on the first temporary RS burst and the unavailable resource if no overlap exists in time domain positions and/or frequency domain positions between the transmission resource determined based on the first temporary RS burst and the unavailable resource. It is determined, in response to determining that no conflict occurs between the transmission resource determined based on the first temporary RS burst and the unavailable resource, that the transmission resource configured to send the third temporary RS is the transmission resource determined based on the first temporary RS burst. The terminal receives the temporary RS by using the transmission resource determined based on the first temporary RS burst. The terminal performs AGC adjustment and/or time-frequency domain tracking by using the received temporary RS.

In another example, the transmission resource determined based on the first temporary RS burst is configured to transmit a temporary RS. It is determined that a conflict occurs between the transmission resource determined based on the first temporary RS burst and the unavailable resource if an overlap exists in time domain positions and/or frequency domain positions between the transmission resource determined based on the first temporary RS burst and the unavailable resource. It is determined, in response to determining that a conflict occurs between the transmission resource determined based on the first temporary RS burst and the unavailable resource, that the transmission resource configured to send the third temporary RS is a transmission resource determined based on a second temporary RS burst, where the second temporary RS burst is a temporary RS burst determined according to the first temporary RS burst. The terminal receives the temporary RS by using the transmission resource determined based on the second temporary RS burst. The terminal performs AGC adjustment and/or time-frequency domain tracking by using the received temporary RS.

It should be noted that those skilled in the art may understand that the method provided in the examples of the disclosure may be executed independently, or may be executed together with some methods in the examples of the disclosure, or some methods in the related art.

In an example, the second temporary RS burst is at least one of the following: a temporary RS burst determined after the first temporary RS burst is shifted by N time domain units in the time domain, where N is determined according to a number of time domain units and/or time domain position occupied by the unavailable resource; temporary RS bursts determined after at least two first temporary RS bursts are shifted by N time domain units in time domain, where a conflict occurs between a transmission resource determined by at least one of the first temporary RS bursts and the unavailable resource, and N is determined according to a number of time domain units and/or time domain position occupied by the unavailable resource; a temporary RS burst determined after a temporary RS sample in the first temporary RS burst being in conflict with the unavailable resource is shifted by N time domain units in time domain, where N is determined according to a number of time domain units and/or time domain position occupied by the unavailable resource; and/or a temporary RS burst determined after the first temporary RS burst is shifted by M frequency domain units in the frequency domain, where M is determined according to a number of frequency domain units and/or frequency domain position occupied by the unavailable resource.

In an example, the transmission resource determined based on the first temporary RS burst is configured to transmit a temporary RS. It is determined that a conflict occurs between the transmission resource determined based on the first temporary RS burst and the unavailable resource if an overlap exists in time domain positions and/or frequency domain positions between the transmission resource determined based on the first temporary RS burst and the unavailable resource. A temporary RS burst determined after the first temporary RS burst is shifted by N time domain units in the time domain is determined as a second temporary RS burst. The shift here may be understood as delaying the first temporary RS burst.

In an example, N is determined according to a number of time domain units and/or time domain position occupied by the unavailable resource. In an example, N may be greater than a first value if the number of time domain units occupied by the unavailable resource is greater than or equal to a number threshold. Alternatively, N may be less than a second value if the number of time domain units occupied by the unavailable resource is less than or equal to a number threshold. It should be noted that no matter how N is determined, the transmission resource occupied by the second temporary RS burst obtained by shifting the first temporary RS burst by N time domain units in the time domain is staggered from a resource occupied by the unavailable resource. That is, the transmission resource occupied by the second temporary RS burst and the unavailable resource do not overlap or conflict. For example, the second temporary RS burst may be transmitted on the first available resource after the unavailable resource.

It should be noted that regardless of the number of resources configured to transmit an RS and being in conflict with the unavailable resource in the first temporary RS burst, the entire first temporary RS burst needs to be shifted or delayed to obtain the second temporary RS burst, such that no conflict occurs between a resource determined by the shifted or delayed second temporary RS burst and any unavailable resource.

In order to better understand the examples of the disclosure, the solution of the disclosure is further explained by one example as follows.

Instance 1

Figure 5:
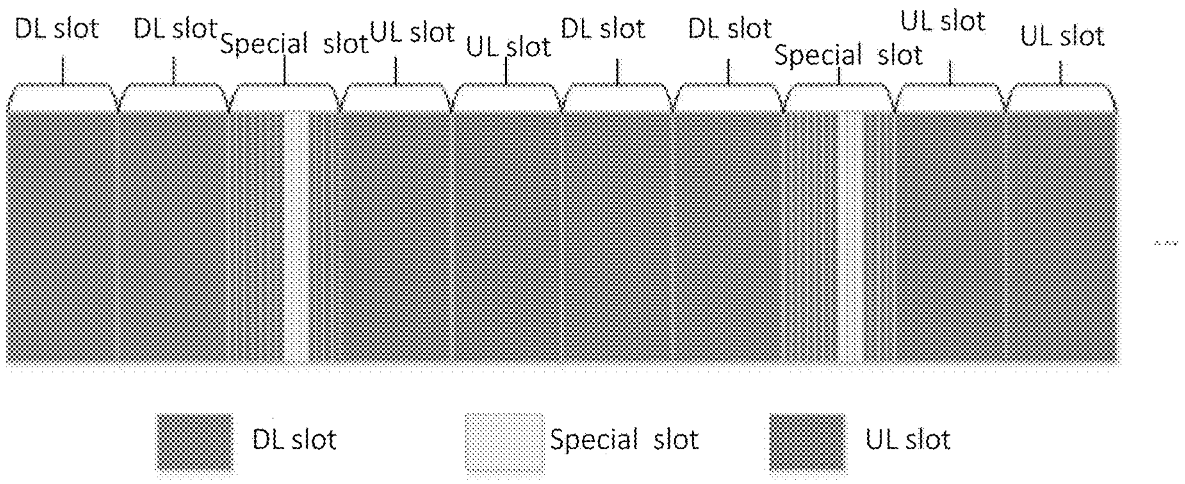
FIG. 5 is a schematic diagram of a resource structure according to an example.

In an example, a cell is a TDD cell, and a network side (which may be a base station) configures TDD uplink (UL) and downlink (DL) configuration by means of a first system message (SIB1) or UE dedicated RRC signaling. In the example, assuming that the TDD UL DL configuration configured by the network side is a single cycle, a specific slot structure is DDSUU, and SCS=15 kHz. The specific slot structure is shown in FIG. 5. Assuming that an uplink and downlink slot structure of a special slot is 7D 3F 4U, that is, includes seven DL symbols, three flexible symbols, and four UL symbols.

Figure 6:
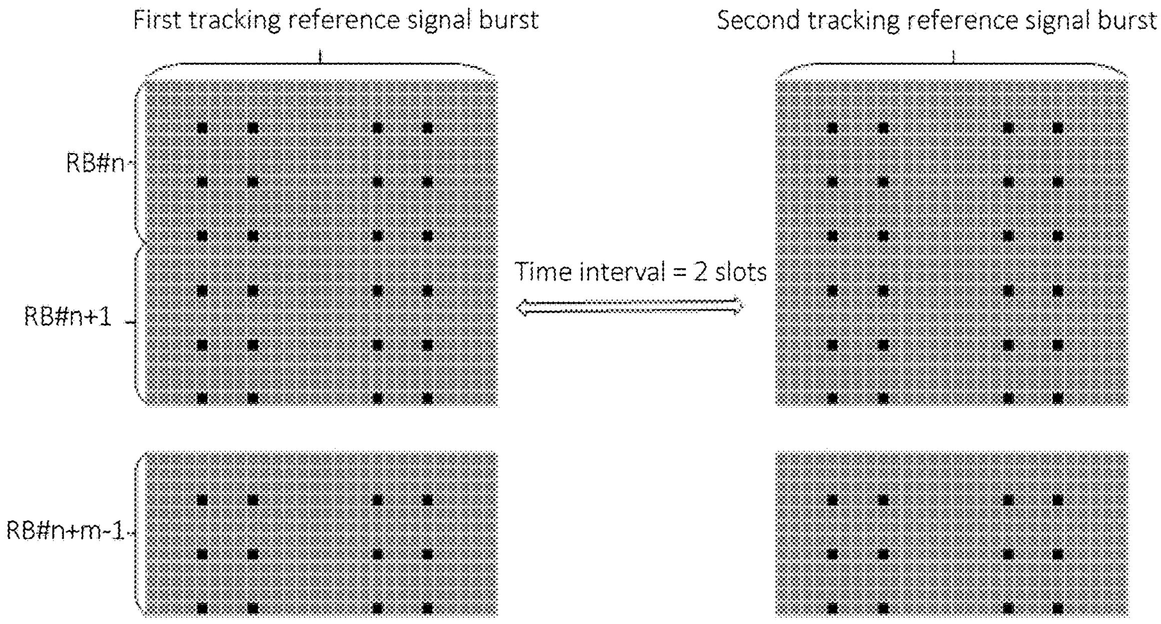
FIG. 6 is a schematic diagram of a tracking reference signal burst according to an example.
Figure 7:
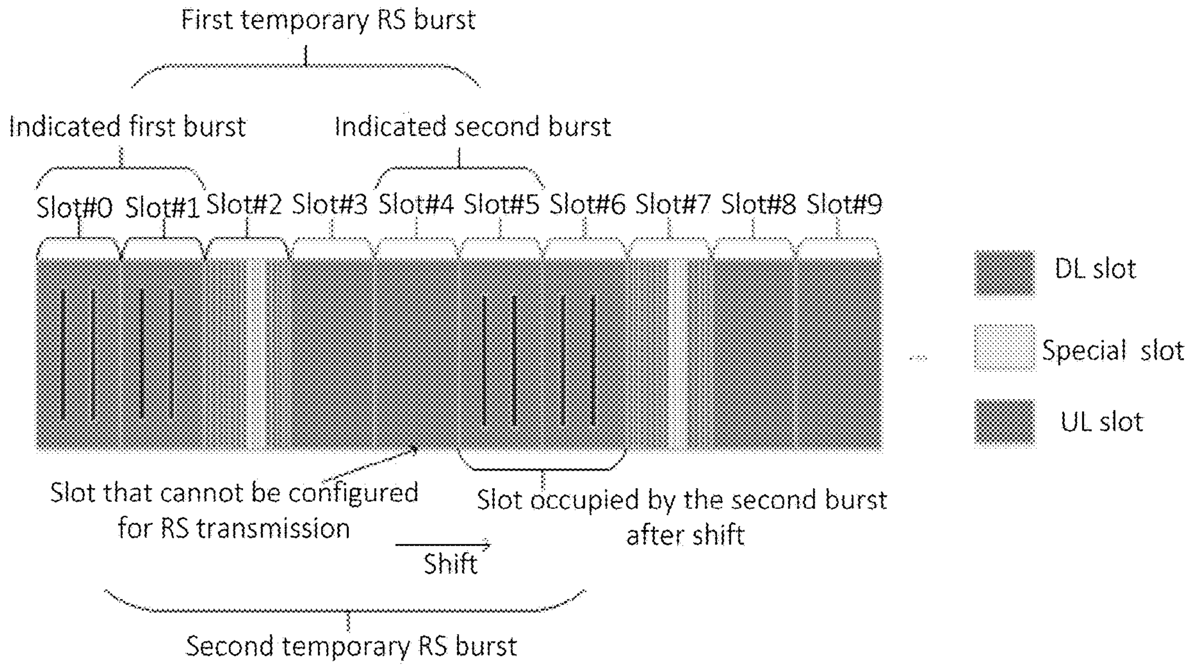
FIG. 7 is a schematic diagram of a slot structure according to an example.

In an example, with reference to FIG. 7, assuming that two first temporary RS bursts triggered by the network side for SCell activation are provided, each first temporary RS burst includes four RS samples on two consecutive downlink slots (the RS samples may be understood as resources for transmitting an RS, for example, may be understood as OFDM symbols for transmitting an RS), and the time interval between the two first temporary RS bursts is 2 slots. In this example, assuming that a pattern of the first temporary RS burst is as shown in FIG. 6, the first temporary RS burst occupies m resource blocks (RBs) in the frequency domain, and occupies two OFDM symbols of #4 (fifth OFDM symbol) and #8 (ninth OFDM symbol) in each slot.

Here, assuming that the base station instructs the first temporary RS burst to start transmission at slot #0 (a 0th slot), the first and second temporary RS samples in the second first temporary RS burst collide with an uplink slot according to TDD UL DL slot allocation of the cell, resulting in failure of normal transmission.

In the example, the base station and the terminal determine how to send and receive an actual time-frequency domain resource position of the temporary RS burst through the following method.

The base station shifts the second first temporary RS burst (by one slot correspondingly, that is, slot #4) to the first slot that may transmit a burst after the unavailable resource for transmission. In the example, the base station transmits the second first temporary RS burst on slot #5 and slot #6. Here, after shifting the second first temporary RS burst, a second temporary RS burst including bursts occupying slot #5 and slot #6 is obtained.

As described above, after determining that the second first temporary RS burst is in conflict with the unavailable resource, the terminal performs a delay operation on the second first temporary RS burst in conflict with the unavailable resource, obtains a second temporary RS burst, and detects and receives the second temporary RS burst on the first available resource after the unavailable resource. In the example, the terminal receives the second temporary RS burst on slot #5 and slot #6. A shift process is shown in FIG. 7.

In an example, the terminal detects and receives a first temporary RS burst on slot #0 and slot #1, detects and receives a second temporary RS burst on slot #5 and slot #6, and performs AGC adjustment and time-frequency domain tracking based on the two bursts, respectively, so as to achieve fast activation of the SCell.

It should be noted that a TDD UL DL frame structure of the TDD cell may be any other configured uplink and downlink ratio, such as DDDSUDDDSU, DDDSU, DDSUDDSUU, etc., which is not limited in the examples of the disclosure.

In an example, the transmission resource determined based on the first temporary RS burst is configured to transmit a temporary RS. It is determined that if an overlap exists in time domain positions and/or frequency domain positions between a transmission resource determined by at least one first temporary RS burst in the plurality of first temporary RS bursts and the unavailable resource, that a conflict occurs between the transmission resource determined by the at least one temporary RS burst and the unavailable resource. Temporary RS bursts are determined as a second temporary RS burst after at least two first temporary RS bursts are shifted by N time domain units in the time domain separately. The shift here may be understood as delaying the first temporary RS burst.

In an example, N is determined according to a number of time domain units and/or time domain position occupied by the unavailable resource. In an example, N may be greater than a first value in response to determining that the number of time domain units occupied by the unavailable resource is greater than or equal to a number threshold. Alternatively, N may be less than a second value in response to determining that the number of time domain units occupied by the unavailable resource is less than or equal to a number threshold. It should be noted that no matter how N is determined, the transmission resource occupied by the second temporary RS burst obtained by shifting the first temporary RS burst by N time domain units in the time domain is staggered from a resource occupied by the unavailable resource. That is, the transmission resource occupied by the second temporary RS burst and the unavailable resource do not overlap or conflict. For example, the second temporary RS burst may be transmitted on a first available resource after the unavailable resource.

In order to better understand the examples of the disclosure, the solution of the disclosure is further explained by one example as follows.

Instance 2

Figure 8:
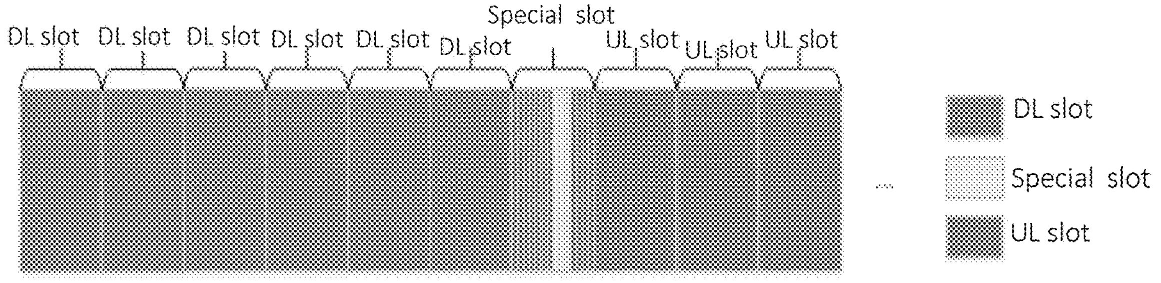
FIG. 8 is a schematic diagram of a slot structure according to an example.

In an example, a cell is a TDD cell, and a network side configures TDD UL DL configuration by means of a SIB1 or UE dedicated RRC signaling. In the example, assuming that the TDD UL DL configuration configured by the network side is a single cycle, a specific slot structure is DDDDDDDSUUU, and SCS=15 kHz. Assuming that an uplink and downlink slot structure of a special slot is 7D 3F 4U, that is, includes seven DL symbols, three flexible symbols, and four UL symbols. The specific slot structure is shown in FIG. 8.

Figure 9:
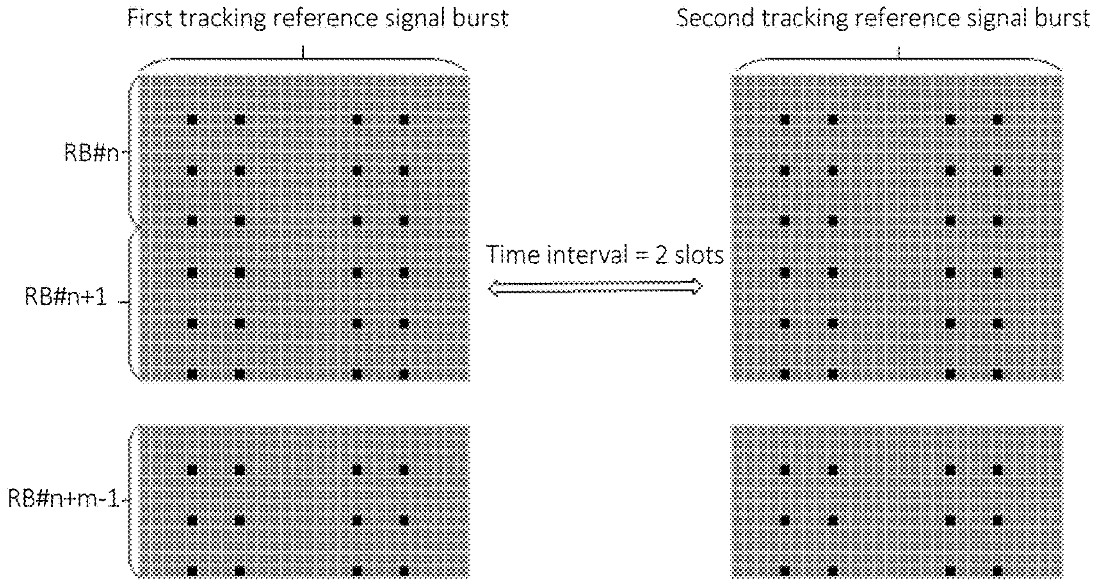
FIG. 9 is a schematic diagram of a tracking reference signal burst according to an example.

In an example, assuming that two first temporary RS bursts triggered by the network side for SCell activation are provided, each first temporary RS burst includes four RS samples on two consecutive DL slots, and the time interval between the two first temporary RS bursts is 2 slots. In the example, assuming that a pattern of the first temporary RS burst is as shown in FIG. 9, the first temporary RS burst occupies m RBs in the frequency domain, and occupies two OFDM symbols of #4 and #8 in each slot.

Assuming that the base station instructs the first temporary RS burst to start transmission at slot #4, four temporary RS samples included in the second first temporary RS burst collide with an uplink slot according to TDD UL DL slot allocation of the cell, resulting in failure of normal transmission.

In the example, the base station and the terminal determine how to send and receive an actual time-frequency domain resource position of the second temporary RS burst through the following method.

The base station delays the first and second first temporary RS bursts to the first slot that may transmit the two bursts after the unavailable resource. In the example, the base station transmits the first second temporary RS burst on slot #0 and slot #1 in a next radio frame, and transmits the second first temporary RS burst on slot #4 and slot #5 in the same radio frame.

Figure 10:
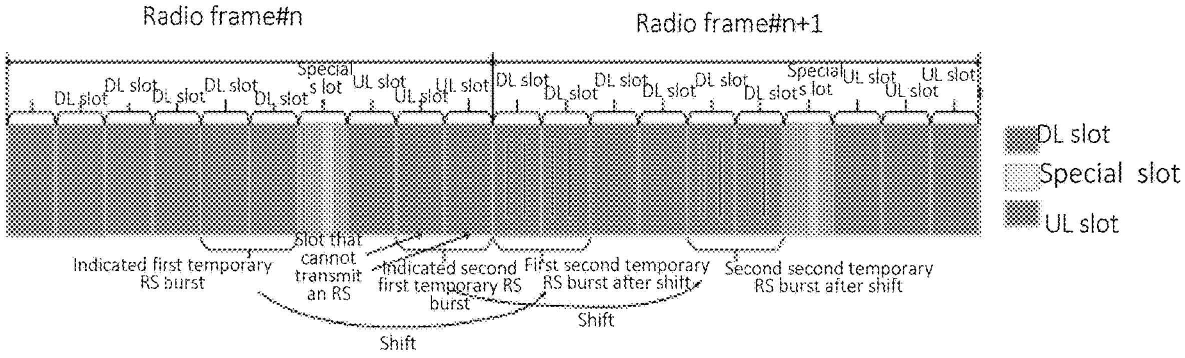
FIG. 10 is a schematic diagram of a slot structure according to an example.

After determining that the second first temporary RS burst is in conflict with the unavailable resource, the terminal performs a delay operation on the first first temporary RS burst and the second first temporary RS burst indicated by the base station, and detects and receives the first second temporary RS burst and the second second temporary RS burst on the first available resource after the unavailable resource. In the example, the terminal receives the first second temporary RS burst on slot #0 and slot #1 in a next radio frame, and transmits the second second temporary RS burst on slot #4 and slot #5 in the same radio frame. Details of the above process are shown in FIG. 10.

In this way, the terminal detects and receives the first second temporary RS burst on slot #0 and slot #1 in a next radio frame indicated by the network side, detects and receives the second second temporary RS burst on slot #4 and slot #5, and performs AGC adjustment and time-frequency domain tracking based on the two bursts respectively, so as to achieve fast activation of the SCell.

In an example, the transmission resource determined based on the first temporary RS burst is a transmission resource for transmitting an RS. Here, the transmission resource may be an RS sample in the first temporary RS burst. Here, the RS sample may be understood as a resource for transmitting an RS, for example, an OFDM symbol for transmitting an RS.

In an example, the RS sample in the first temporary RS burst is configured to transmit a temporary RS. It is determined that a conflict occurs between the RS sample in the first temporary RS burst and the unavailable resource if an overlap exists in time domain positions and/or frequency domain positions between the RS sample in the first temporary RS burst and the unavailable resource. A temporary RS burst is determined a second temporary RS burst after a temporary RS sample in the first temporary RS burst, and in conflict with the unavailable resource is shifted by N time domain units in the time domain. The shift here may be understood as delaying the first temporary RS burst.

In an example, N is determined according to a number of time domain units and/or time domain position occupied by the unavailable resource. In an example, N may be greater than a first value in response to determining that the number of time domain units occupied by the unavailable resource is greater than or equal to a number threshold. Alternatively, N may be less than a second value in response to determining that the number of time domain units occupied by the unavailable resource is less than or equal to a number threshold. It should be noted that no matter how N is determined, the transmission resource occupied by the second temporary RS burst obtained by shifting the RS sample in the first temporary RS burst by N time domain units in the time domain is staggered from a resource occupied by the unavailable resource. That is, the transmission resource occupied by the second temporary RS burst and the unavailable resource do not overlap or conflict. For example, the second temporary RS burst may be transmitted on a first available resource after the unavailable resource.

In order to better understand the examples of the disclosure, the solution of the disclosure is further explained by one example as follows.

Instance 3

Figure 11:
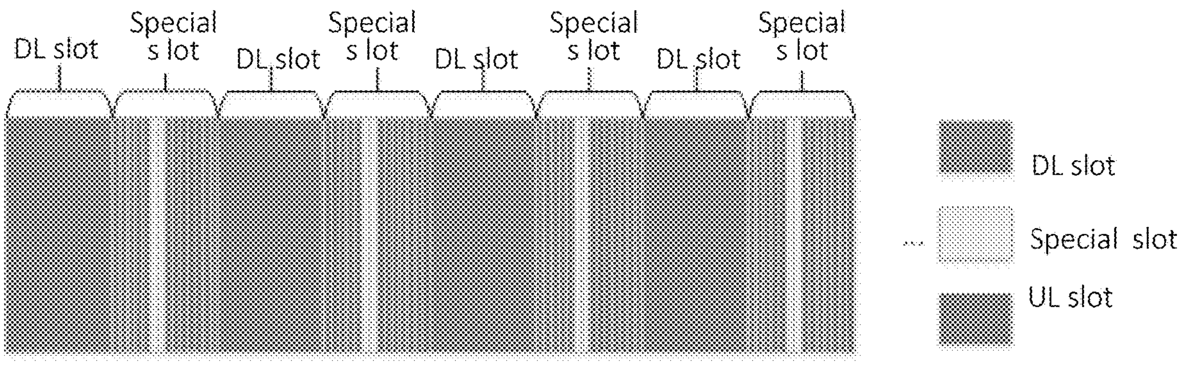
FIG. 11 is a schematic diagram of a slot structure according to an example.

In an example, a cell is a TDD cell, and a network side configures TDD UL DL configuration by means of a SIB1 or UE dedicated RRC signaling. In the example, assuming that the TDD UL DL configuration configured by the network side is a single cycle, a specific slot structure is DSDS, and SCS=15 kHz. Assuming that an uplink and downlink slot structure of a special slot is 5D 2F 7U, that is, includes five DL symbols, two flexible symbols, and seven UL symbols. The specific slot structure is shown in FIG. 11.

Figure 12:
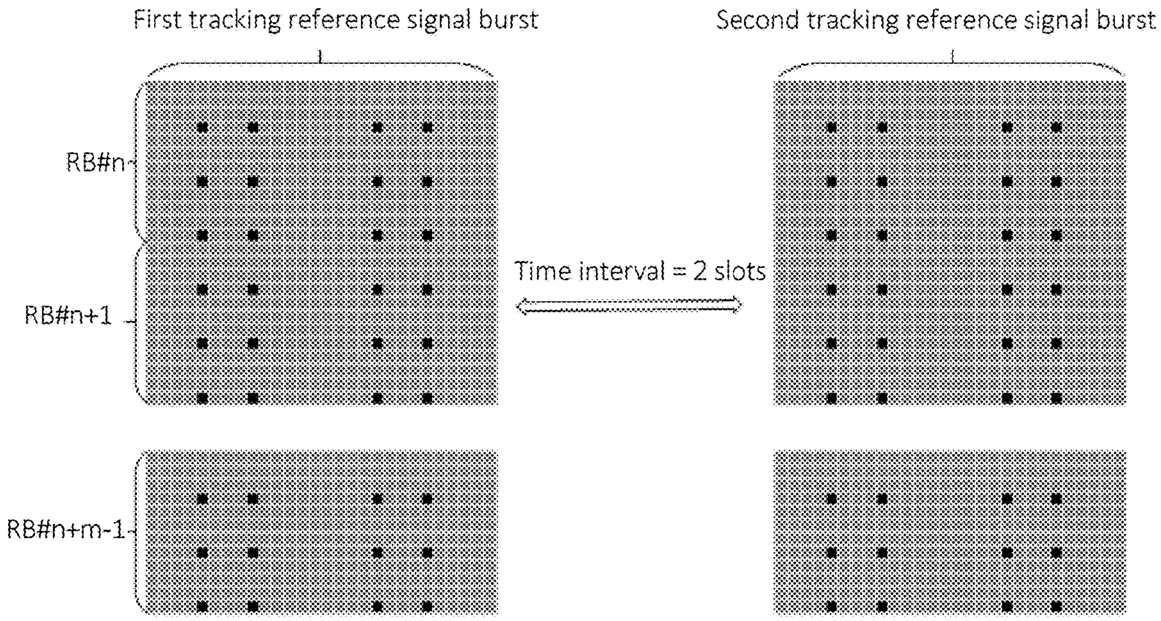
FIG. 12 is a schematic diagram of a tracking reference signal burst according to an example.

In an example, when temporary RSs triggered by the network side for SCell activation include two first temporary RS bursts, each first temporary RS burst includes four RS samples on two consecutive downlink slots, and the time interval between the two first temporary RS bursts is 2 slots. In the example, assuming that the first temporary RS burst is as shown in FIG. 12, the first temporary RS burst occupies m RBs in the frequency domain, and occupies two OFDM symbols of #4 and #8 in each slot.

In an example, the base station instructs the first temporary RS burst to start transmission at slot #0, and four temporary RS samples included in the first first temporary RS burst and the second first temporary RS burst collide with an uplink slot according to TDD UL DL slot allocation of the cell, resulting in failure of normal transmission.

In the example, the base station and the terminal determine how to send and receive an actual time-frequency domain resource position of the second temporary RS burst through the following method.

The base station shifts a third RS sample and a fourth RS sample included in the first first temporary RS burst and the second first temporary RS burst in the time domain, so as not to be in conflict with a DL symbol. In the example, the base station transmits two RS samples in the first second temporary RS burst on OS #0 and OS #4 of slot #1 and transmits two RS samples in the second second temporary RS burst on OS #0 and OS #4 of slot #5.

After determining that the first first temporary RS burst and the second first temporary RS burst are in conflict with the unavailable resource, the terminal shifts RS samples included in the first first temporary RS burst and the second first temporary RS burst indicated by the base station in the time domain until the RS samples are in no conflict with any unavailable resource. In the example, the terminal detects and receives two RS samples in the first second temporary RS burst on OS #0 and OS #4 of slot #1, and detects and receives two RS samples in the second second temporary RS burst on OS #0 and OS #4 of slot #5.

Figure 13:
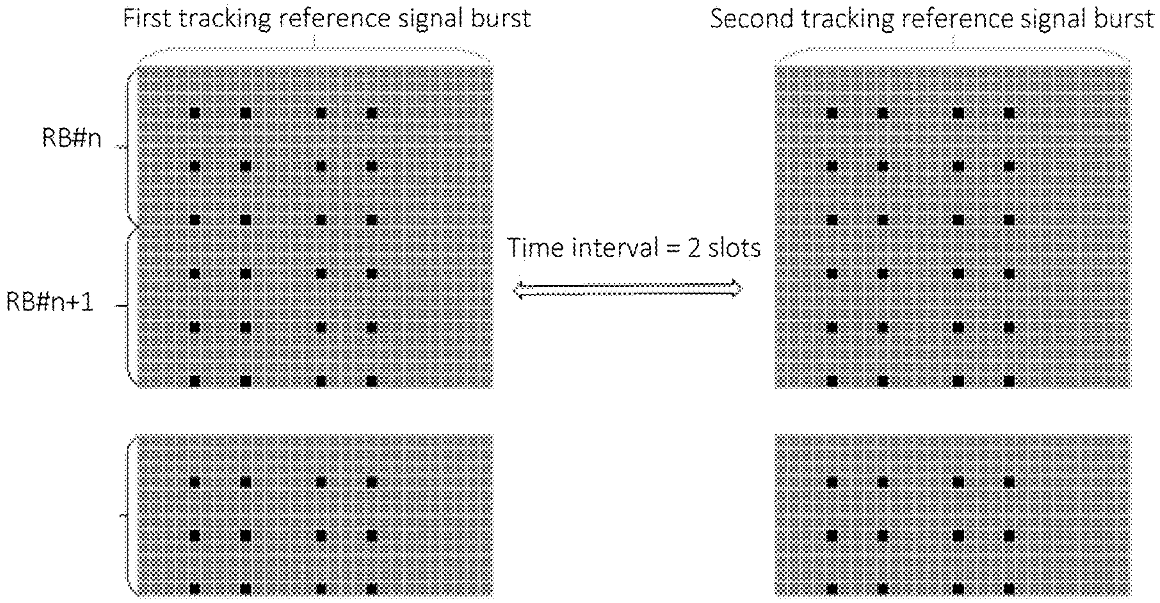
FIG. 13 is a schematic diagram of a tracking reference signal burst according to an example.

A time-frequency domain pattern of each second temporary RS burst determined through the above method is shown in FIG. 13.

It should be noted that when the first temporary RS burst indicated by the network side is in conflict with a CRS, the RS sample in conflict may also be shifted in the time domain through the above method until the second RS burst is finally determined to be in no conflict with any CRS.

In an example, the transmission resource determined based on the first temporary RS burst is configured to transmit a temporary RS. It is determined that a conflict occurs between the transmission resource determined based on the first temporary RS burst and the unavailable resource if an overlap exists in time domain positions and/or frequency domain positions between the transmission resource determined based on the first temporary RS burst and the unavailable resource. A temporary RS burst determined after the first temporary RS burst is shifted by M frequency domain units in the frequency domain is determined as a second temporary RS burst. The shift here may be understood as a frequency domain shift operation on the first temporary RS burst.

In an example, Mis determined according to a number of frequency domain units and/or the frequency domain position occupied by the unavailable resource. In an example, M may be greater than a first value in response to determining that the number of frequency domain units occupied by the unavailable resource is greater than or equal to a number threshold. Alternatively, M may be less than a second value in response to determining that the number of frequency domain units occupied by the unavailable resource is less than or equal to a number threshold. It should be noted that no matter how M is determined, the transmission resource occupied by the second temporary RS burst obtained by shifting the transmission resource determined by the first temporary RS burst by M frequency domain units in the frequency domain is staggered from a resource occupied by the unavailable resource. That is, the transmission resource occupied by the second temporary RS burst and the unavailable resource do not overlap or conflict. For example, the second temporary RS burst may be transmitted on a first available resource after the unavailable resource.

In order to better understand the examples of the disclosure, the solution of the disclosure is further explained by one example as follows.

Instance 4

Figure 14:
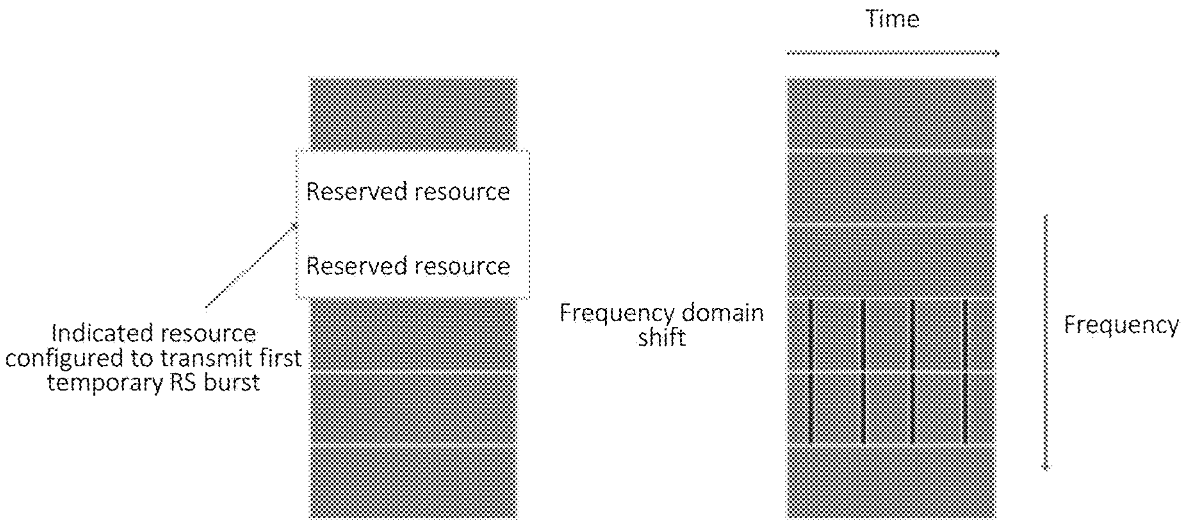
FIG. 14 is a schematic diagram of a frequency domain structure according to an example.

In an example, the first temporary RS burst indicated by the network side is in conflict with an unavailable resource on a downlink OFDM symbol of a downlink slot or a special slot, or on a flexible symbol. With reference to FIG. 14, when sending the first temporary RS burst, the base station side shifts the first temporary RS burst in the frequency domain, and obtains a second temporary RS burst. The second temporary RS burst is in no conflict with any unavailable resource. The terminal detects and receives the second temporary RS burst on the shifted resource based on the same method. A frequency domain offset may be predefined or network indicated.

In an example, N and/or M are/is less than or equal to a preset number threshold. Here, the preset number threshold may be predefined or indicated by a network. The preset number threshold corresponds to a delay window. It should be noted that a longest delay window is predefined by network configuration or a protocol. If a second temporary RS burst cannot be detected and received according to the above rule within the delay window, the method falls back to a default mode to execute AGC adjustment and/or time-frequency domain tracking. Here, the default mode is an AGC and/or time-frequency domain tracking operation according to an SSB.

Figure 15:
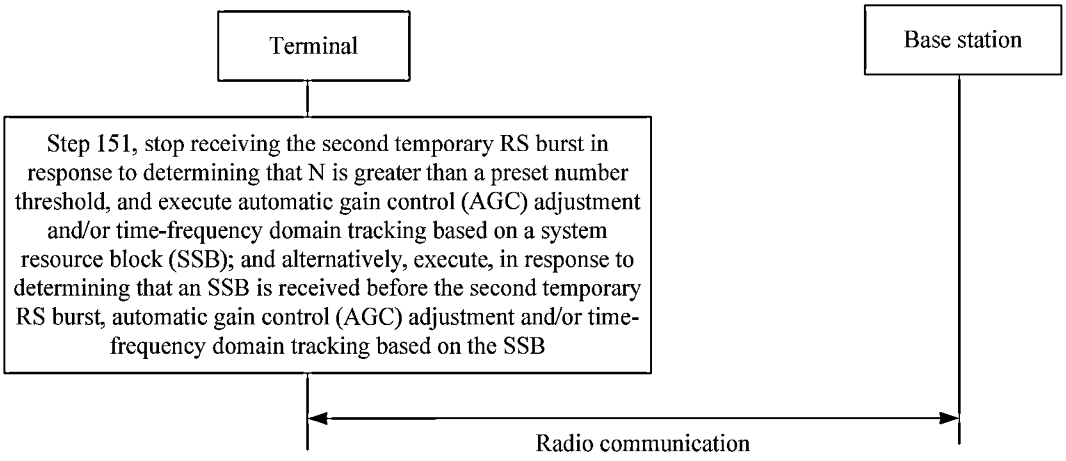
FIG. 15 is a flowchart of a method for transmitting a temporary reference signal according to an example.

As shown in FIG. 15, the example provides a method for transmitting a temporary reference signal. The method is performed by a terminal, and includes Step 151.

In Step 151, the terminal stops receiving the second temporary RS burst in response to determining that N is greater than a preset number threshold, and executes automatic gain control (AGC) adjustment and/or time-frequency domain tracking based on a system resource block (SSB); and alternatively, executes, in response to determining that an SSB is received before the second temporary RS burst, automatic gain control (AGC) adjustment and/or time-frequency domain tracking based on the SSB.

In an example, the preset number threshold corresponds to a delay window. A longest delay window is predefined by network configuration or a protocol. If a second temporary RS burst cannot be detected and received according to the above rule within the delay window, the method falls back to a default mode to execute AGC adjustment and/or time-frequency domain tracking. Here, the default mode is an AGC and time-frequency domain tracking operation according to an SSB.

In an example, if the SSB arrives before an available resource, an activation operation on the SCell proceeds in a default mode.

In an example, when the base station configures or triggers two first temporary RS bursts for an SCell activation process, if a conflict occurs between any RS sample in the two first temporary RS bursts and the unavailable resource, a unified shift operation is performed on the two first temporary RS bursts until the two temporary RS bursts after shift (that is, the second temporary RS burst) are in no conflict with any unavailable resource. It should be noted that a longest delay window is predefined by network configuration or a protocol. If a second temporary RS burst cannot be detected and received according to the above rule within the delay window, the method falls back to a default mode, that is, stops receiving the second temporary RS burst, and falls back to the default mode to execute AGC adjustment and/or time-frequency domain tracking. Alternatively, if the SSB arrives before the available resource, automatic gain control (AGC) adjustment and/or time-frequency domain tracking is executed on the SSB.

In another example, a temporary RS sample in conflict with an unavailable resource is delayed, and the delayed temporary RS sample is detected and received on a first available resource after the unavailable resource. It should be noted that a maximum delay window configured to delay an RS sample is predefined by network configuration or a protocol. If a resource for transmitting an RS sample cannot be obtained within the maximum delay window, the method falls back to a default mode, that is, it falls back to the default mode to execute AGC adjustment and/or time-frequency domain tracking.

It should be noted that those skilled in the art may understand that the method provided in the examples of the disclosure may be executed independently, or may be executed together with some methods in the examples of the disclosure, or some methods in the related art.

In an example, the first temporary RS burst is at least one of the following: a temporary RS burst configured according to higher-layer signaling, where the higher-layer signaling may be RRC signaling; a temporary RS burst determined according to received dynamic indication information sent by a network; a temporary RS burst configured according to higher-layer signaling and determined according to dynamic indication information sent by the network side; and/or a temporary RS burst determined according to default configuration information.

In an example, the first temporary RS burst is determined according to higher-layer signaling and dynamic indication information sent by the network side.

In an example, the unavailable resource includes one or more of the following: an uplink symbol resource for uplink transmission; an uplink slot resource for uplink transmission; a resource configured to transmit a cell-specific reference signal (CRS), a resource configured to transmit an SSB; and/or a reserved resource preconfigured by a network.

Figure 16:
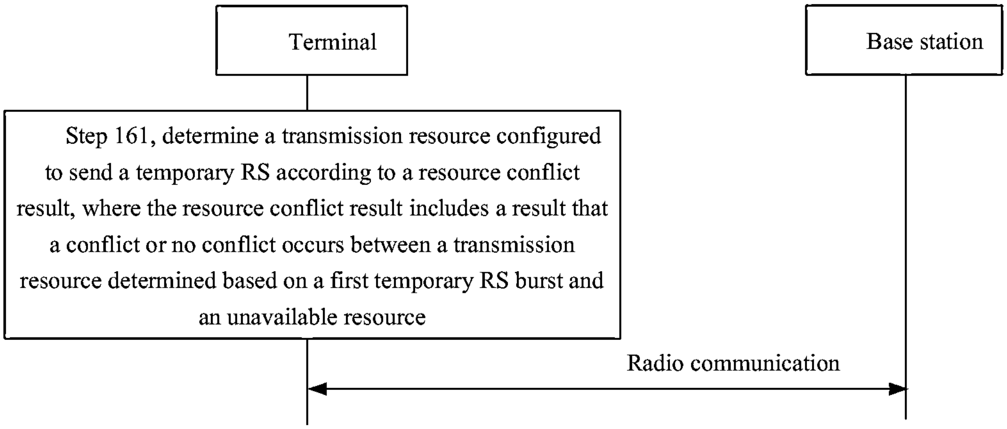
FIG. 16 is a flowchart of a method for transmitting a temporary reference signal according to an example.

As shown in FIG. 16, the example provides a method for transmitting a temporary reference signal. The method is performed by a base station, and includes Step 161.

In Step 161, the terminal determines a transmission resource configured to send the temporary RS according to a resource conflict result, where the resource conflict result includes a result that a conflict or no conflict occurs between a transmission resource determined based on a first temporary RS burst and an unavailable resource.

Here, the transmission resource configured to send the temporary RS indicates a transmission resource configured to send a third temporary RS. The transmission resource determined based on the first temporary RS burst is configured to transmit a temporary RS.

Here, the terminal may be, but is not limited to, a mobile phone, a tablet personal computer, a wearable device, a vehicle-mounted terminal, a roadside unit (RSU), a smart home terminal, an industrial sensing device, and/or a medical device, etc. For example, the smart home terminal may include a camera, a temperature collection device, a brightness collection device, etc.

Here, the base station involved in the disclosure may be various types of base stations, for example, a base station of a 3rd generation mobile communication (3G) network, a base station of a 4th generation mobile communication (4G) network, a base station of a 5th generation mobile communication (5G) network, or other evolved base stations.

Here, the unavailable resource includes one or more of the following: an uplink symbol resource for uplink transmission; an uplink slot resource for uplink transmission; a resource configured to transmit a cell-specific reference signal (CRS); a resource configured to transmit an SSB; and/or a reserved resource preconfigured by a network.

Here, it should be noted that the resource in the disclosure may be a time domain resource and/or a frequency domain resource. The resource may be determined according to a specific application scene, which is not limited here. For example, the uplink slot resource configured for uplink transmission is a time domain resource, and resources configured to transmit a cell-specific reference signal (CRS) are a time domain resource and a frequency domain resource. Moreover, the transmission resources in the disclosure also have the above resource features.

Here, a conflict between the transmission resource determined based on the first temporary RS burst and the unavailable resource may be an overlap in time domain positions and/or frequency domain positions between the transmission resource determined based on the first temporary RS burst and the unavailable resource. Here, no conflict between the transmission resource determined based on the first temporary RS burst and the unavailable resource may be no overlap in time domain positions and/or frequency domain positions between the transmission resource determined based on the first temporary RS burst and the unavailable resource. Here, the transmission resource is a resource for transmitting an RS.

In an example, the terminal performs resource comparison on the transmission resource determined according to the first temporary RS burst and the unavailable resource, and obtains a resource conflict result. The resource conflict result includes a result that a conflict or no conflict occurs between a transmission resource determined based on a first temporary RS burst and an unavailable resource. It is determined, in response to determining that no conflict occurs between the transmission resource determined based on the first temporary RS burst and the unavailable resource, that the transmission resource configured to send the third temporary RS is the transmission resource determined based on the first temporary RS burst; and alternatively, it is determined, in response to determining that a conflict occurs between the transmission resource determined based on the first temporary RS burst and the unavailable resource, that the transmission resource configured to send the third temporary RS is a transmission resource determined based on a second temporary RS burst. The second temporary RS burst is a burst determined according to the first temporary RS burst. The terminal receives the temporary RS by using the transmission resource configured to send the third temporary RS. The terminal performs AGC adjustment and/or time-frequency domain tracking by using the received temporary RS.

Here, the second temporary RS burst may be a burst determined after the first temporary RS burst is shifted overall in time domain and/or frequency domain; alternatively, the second temporary RS burst may be a burst determined after a resource for transmitting a temporary RS in the first temporary RS burst is shifted in time domain and/or frequency domain.

It should be noted that those skilled in the art may understand that the method provided in the examples of the disclosure may be executed independently, or may be executed together with some methods in the examples of the disclosure, or some methods in the related art.

Figure 17:
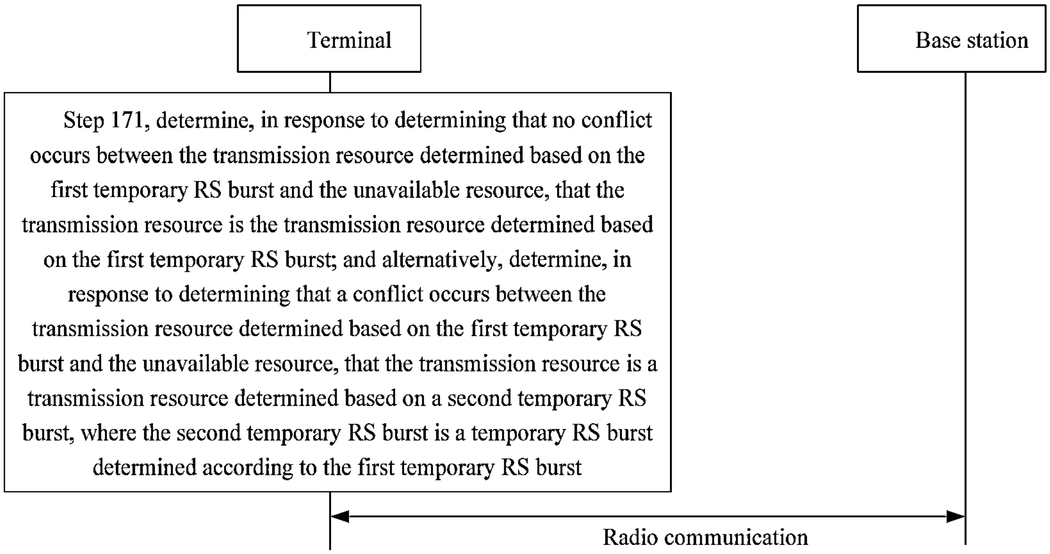
FIG. 17 is a flowchart of a method for transmitting a temporary reference signal according to an example.

As shown in FIG. 17, the example provides a method for transmitting a temporary reference signal. The method is performed by a base station, and includes Step 171.

In Step 171, the base station either determines, in response to determining that no conflict occurs between the transmission resource determined based on the first temporary RS burst and the unavailable resource, that the transmission resource is the transmission resource determined based on the first temporary RS burst; or determines, in response to determining that a conflict occurs between the transmission resource determined based on the first temporary RS burst and the unavailable resource, that the transmission resource configured to send the third temporary RS is a transmission resource determined based on a second temporary RS burst, where the second temporary RS burst is a temporary RS burst determined according to the first temporary RS burst.

In an example, the transmission resource determined based on the first temporary RS burst is configured to transmit a temporary RS. It is determined that no conflict occurs between the transmission resource determined based on the first temporary RS burst and the unavailable resource if no overlap exists in time domain positions and/or frequency domain positions between the transmission resource determined based on the first temporary RS burst and the unavailable resource. It is determined, in response to determining that no conflict occurs between the transmission resource determined based on the first temporary RS burst and the unavailable resource, that the transmission resource configured to send the third temporary RS is the transmission resource determined based on the first temporary RS burst. The terminal receives the temporary RS by using the transmission resource determined based on the first temporary RS burst. The terminal performs AGC adjustment and/or time-frequency domain tracking by using the received temporary RS.

In another example, the transmission resource determined based on the first temporary RS burst is configured to transmit a temporary RS. It is determined that a conflict occurs between the transmission resource determined based on the first temporary RS burst and the unavailable resource if an overlap exists in time domain positions and/or frequency domain positions between the transmission resource determined based on the first temporary RS burst and the unavailable resource. It is determined, in response to determining that a conflict occurs between the transmission resource determined based on the first temporary RS burst and the unavailable resource, that the transmission resource configured to send the third temporary RS is a transmission resource determined based on a second temporary RS burst, where the second temporary RS burst is a temporary RS burst determined according to the first temporary RS burst. The terminal receives the temporary RS by using the transmission resource determined based on the second temporary RS burst. The terminal performs AGC adjustment and/or time-frequency domain tracking by using the received temporary RS.

It should be noted that those skilled in the art may understand that the method provided in the examples of the disclosure may be executed independently, or may be executed together with some methods in the examples of the disclosure, or some methods in the related art.

In an example, the second temporary RS burst is at least one of the following: a temporary RS burst determined after the first temporary RS burst is shifted by N time domain units in the time domain, where N is determined according to the number position of time domain units and/or the time domain position occupied by the unavailable resource; temporary RS bursts determined after at least two first temporary RS bursts are shifted by N time domain units in time domain, where a conflict occurs between a transmission resource determined by at least one of the first temporary RS bursts and the unavailable resource, and N is determined according to a number of time domain units and/or time domain position occupied by the unavailable resource; a temporary RS burst determined after a temporary RS sample in the first temporary RS burst being in conflict with the unavailable resource is shifted by N time domain units in time domain, where N is determined according to a number of time domain units and/or time domain position occupied by the unavailable resource; and/or a temporary RS burst determined after the first temporary RS burst is shifted by M frequency domain units in the frequency domain, where M is determined according to a number of frequency domain units and/or frequency domain position occupied by the unavailable resource.

In an example, the transmission resource determined based on the first temporary RS burst is configured to transmit a temporary RS. It is determined that a conflict occurs between the transmission resource determined based on the first temporary RS burst and the unavailable resource if an overlap exists in time domain positions and/or frequency domain positions between the transmission resource determined based on the first temporary RS burst and the unavailable resource. A temporary RS burst determined after the first temporary RS burst is shifted by N time domain units in the time domain is determined as a second temporary RS burst. The shift here may be understood as delaying the first temporary RS burst.

In an example, N is determined according to a number of time domain units and/or time domain position occupied by the unavailable resource. In an example, N may be greater than a first value if the number of time domain units occupied by the unavailable resource is greater than or equal to a number threshold. Alternatively, N may be less than a second value if the number of time domain units occupied by the unavailable resource is less than or equal to a number threshold. It should be noted that no matter how N is determined, the transmission resource occupied by the second temporary RS burst obtained by shifting the first temporary RS burst by N time domain units in the time domain is staggered from a resource occupied by the unavailable resource. That is, the transmission resource occupied by the second temporary RS burst and the unavailable resource do not overlap or conflict. For example, the second temporary RS burst may be transmitted on a first available resource after the unavailable resource.

It should be noted that regardless of the number of resources configured to transmit an RS and being in conflict with the unavailable resource in the first temporary RS burst, the entire first temporary RS burst needs to be shifted or delayed to obtain the second temporary RS burst, such that no conflict occurs between a resource determined by the shifted or delayed second temporary RS burst and any unavailable resource.

The examples of the disclosure are better understood with reference to Instance 1 again.

In an example, the transmission resource determined based on the first temporary RS burst is configured to transmit a temporary RS. It is determined that if an overlap exists in time domain positions and/or frequency domain positions between a transmission resource determined by at least one first temporary RS burst in the plurality of first temporary RS bursts and the unavailable resource, that a conflict occurs between the transmission resource determined by the at least one temporary RS burst and the unavailable resource. Temporary RS bursts are determined as a second temporary RS burst after at least two first temporary RS bursts are shifted by N time domain units in the time domain separately. The shift here may be understood as delaying the first temporary RS burst.

In an example, N is determined according to a number of time domain units and/or time domain position occupied by the unavailable resource. In an example, N may be greater than a first value in response to determining that the number of time domain units occupied by the unavailable resource is greater than or equal to a number threshold. Alternatively, N may be less than a second value in response to determining that the number of time domain units occupied by the unavailable resource is less than or equal to a number threshold. It should be noted that no matter how N is determined, the transmission resource occupied by the second temporary RS burst obtained by shifting the first temporary RS burst by N time domain units in the time domain is staggered from a resource occupied by the unavailable resource. That is, the transmission resource occupied by the second temporary RS burst and the unavailable resource do not overlap or conflict. For example, the second temporary RS burst may be transmitted on a first available resource after the unavailable resource.

The examples of the disclosure are better understood with reference to Instance 2 again.

In an example, the transmission resource determined based on the first temporary RS burst is a transmission resource for transmitting an RS. For example, the transmission resource may be an RS sample in the first temporary RS burst. For example, the RS sample may be understood as a resource for transmitting an RS, for example, an OFDM symbol for transmitting an RS.

In an example, the RS sample in the first temporary RS burst is configured to transmit a temporary RS. It is determined that a conflict occurs between the RS sample in the first temporary RS burst and the unavailable resource if an overlap exists in time domain positions and/or frequency domain positions between the RS sample in the first temporary RS burst and the unavailable resource. A temporary RS burst determined after a temporary RS sample in the first temporary RS burst and in conflict with the unavailable resource is shifted by N time domain units in the time domain, and is determined as a second temporary RS burst. The shift here may be understood as delaying the first temporary RS burst.

In an example, N is determined according to a number of time domain units and/or time domain position occupied by the unavailable resource. In an example, N may be greater than a first value in response to determining that the number of time domain units occupied by the unavailable resource is greater than or equal to a number threshold. Alternatively, N may be less than a second value in response to determining that the number of time domain units occupied by the unavailable resource is less than or equal to a number threshold. It should be noted that no matter how N is determined, the transmission resource occupied by the second temporary RS burst obtained by shifting the RS sample in the first temporary RS burst by N time domain units in the time domain is staggered from a resource occupied by the unavailable resource. That is, the transmission resource occupied by the second temporary RS burst and the unavailable resource do not overlap or conflict. For example, the second temporary RS burst may be transmitted on a first available resource after the unavailable resource.

The examples of the disclosure are with reference to Instance 3 again.

In an example, the transmission resource determined based on the first temporary RS burst is configured to transmit a temporary RS. It is determined that a conflict occurs between the transmission resource determined based on the first temporary RS burst and the unavailable resource if an overlap exists in time domain positions and/or frequency domain positions between the transmission resource determined based on the first temporary RS burst and the unavailable resource. A temporary RS burst determined after the first temporary RS burst is shifted by M frequency domain units in the frequency domain is determined as a second temporary RS burst. The shift here may be understood as a frequency domain shift operation on the first temporary RS burst.

In an example, M is determined according to a number of frequency domain units and/or the frequency domain position occupied by the unavailable resource. In an example, M may be greater than a first value in response to determining that the number of frequency domain units occupied by the unavailable resource is greater than or equal to a number threshold. Alternatively, M may be less than a second value in response to determining that the number of frequency domain units occupied by the unavailable resource is less than or equal to a number threshold. It should be noted that no matter how M is determined, the transmission resource occupied by the second temporary RS burst obtained by shifting the transmission resource determined by the first temporary RS burst by M frequency domain units in the frequency domain is staggered from a resource occupied by the unavailable resource. That is, the transmission resource occupied by the second temporary RS burst and the unavailable resource do not overlap or conflict. For example, the second temporary RS burst may be transmitted on a first available resource after the unavailable resource.

The examples of the disclosure are better understood with reference to Instance 4 again.

In an example, N and/or M are/is less than or equal to a preset number threshold. Here, the preset number threshold may be predefined or indicated by a network. The preset number threshold corresponds to a delay window. It should be noted that a longest delay window is predefined by network configuration or a protocol. If a second temporary RS burst cannot be detected and received according to the above rule within the delay window, the method falls back to a default mode to execute AGC adjustment and/or time-frequency domain tracking. Here, the default mode is an AGC and/or time-frequency domain tracking operation according to an SSB.

Figure 18:
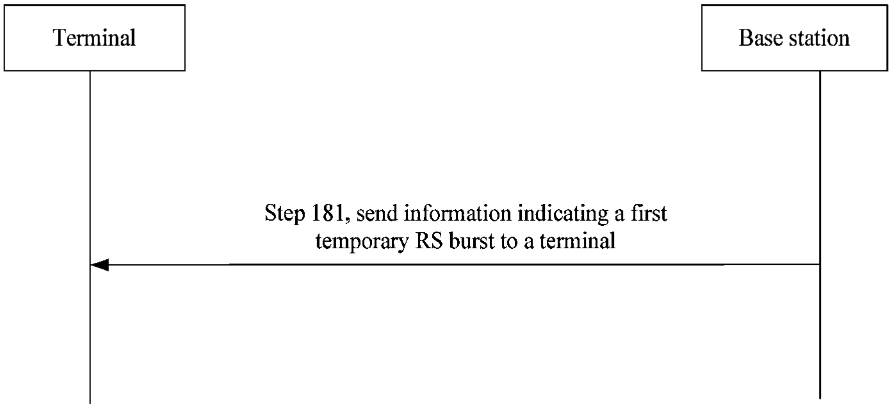
FIG. 18 is a flowchart of a method for transmitting a temporary reference signal according to an example.

As shown in FIG. 18, the example provides a method for transmitting a temporary reference signal. The method is performed by a base station, and includes Step 181.

In Step 181, the terminal sends information indicating a first temporary RS burst to a terminal.

Here, the information indicating the first temporary RS burst may be sent based on higher-layer signaling. Further, the information indicating the first temporary RS burst may be sent by using other dynamic information.

It should be noted that those skilled in the art may understand that the method provided in the examples of the disclosure may be executed independently, or may be executed together with some methods in the examples of the disclosure, or some methods in the related art.

In an example, the first temporary RS burst is at least one of the following: a temporary RS burst configured according to higher-layer signaling, where the higher-layer signaling may be RRC signaling; a temporary RS burst determined according to received dynamic indication information sent by a network; a temporary RS burst configured according to higher-layer signaling and determined according to dynamic indication information sent by the network side; and/or a temporary RS burst determined according to default configuration information.

In an example, the first temporary RS burst is determined according to higher-layer signaling and dynamic indication information sent by the network side.

In an example, the unavailable resource includes one or more of the following: an uplink symbol resource for uplink transmission; an uplink slot resource for uplink transmission; a resource configured to transmit a cell-specific reference signal (CRS); a resource configured to transmit an SSB; and/or a reserved resource preconfigured by a network.

Figure 19:
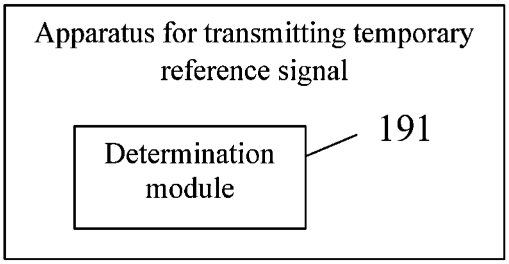
FIG. 19 is a schematic diagram of an apparatus for transmitting a temporary reference signal according to an example.

As shown FIG. 19, the example provides an apparatus for transmitting a temporary reference signal. The apparatus for transmitting a temporary reference signal includes a determination module 191.

The determination module 191 is configured to determine a transmission resource configured to receive a third temporary reference signal (RS) according to a resource conflict result, where the resource conflict result includes a result that a conflict or no conflict occurs between a transmission resource determined based on a first temporary RS burst and an unavailable resource.

It should be noted that those skilled in the art may understand that the method provided in the examples of the disclosure may be executed independently, or may be executed together with some methods in the examples of the disclosure, or some methods in related art.

Figure 20:
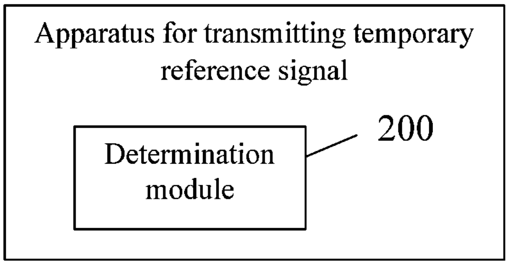
FIG. 20 is a schematic diagram of an apparatus for transmitting a temporary reference signal according to an example.

As shown FIG. 20, the example provides an apparatus for transmitting a temporary reference signal. The apparatus for transmitting a temporary reference signal includes a determination module 200.

The determination module 200 is configured to determine a transmission resource configured to send a third temporary RS according to a resource conflict result, where the resource conflict result includes a result that a conflict or no conflict occurs between a transmission resource determined based on a first temporary RS burst and an unavailable resource.

It should be noted that those skilled in the art may understand that the method provided in the examples of the disclosure may be executed independently, or may be executed together with some methods in the examples of the disclosure or some methods in related art.

An example of the disclosure provides a communication device. The communication device includes a processor and a memory configured to store a processor executable instruction. The processor is configured to implement the method configured for any one of the examples of the disclosure when running the executable instruction.

The processor may include various types of storage media that are non-transitory computer storage media capable of continuing to remember the information stored after the communication device is powered down.

The processor may be connected to the memory by means of a bus, etc., for reading an executable program stored in the memory.

The example of the disclosure further provides a non-transitory computer storage medium. The non-transitory computer storage medium stores a computer-executable program, and when executed by a processor, the executable program implements the method according to any one of the examples of the disclosure.

With respect to the devices in the above examples, particular ways in which the various modules execute operations have been described in detail in the examples relating to the method, and will not be described in detail here.

Figure 21:
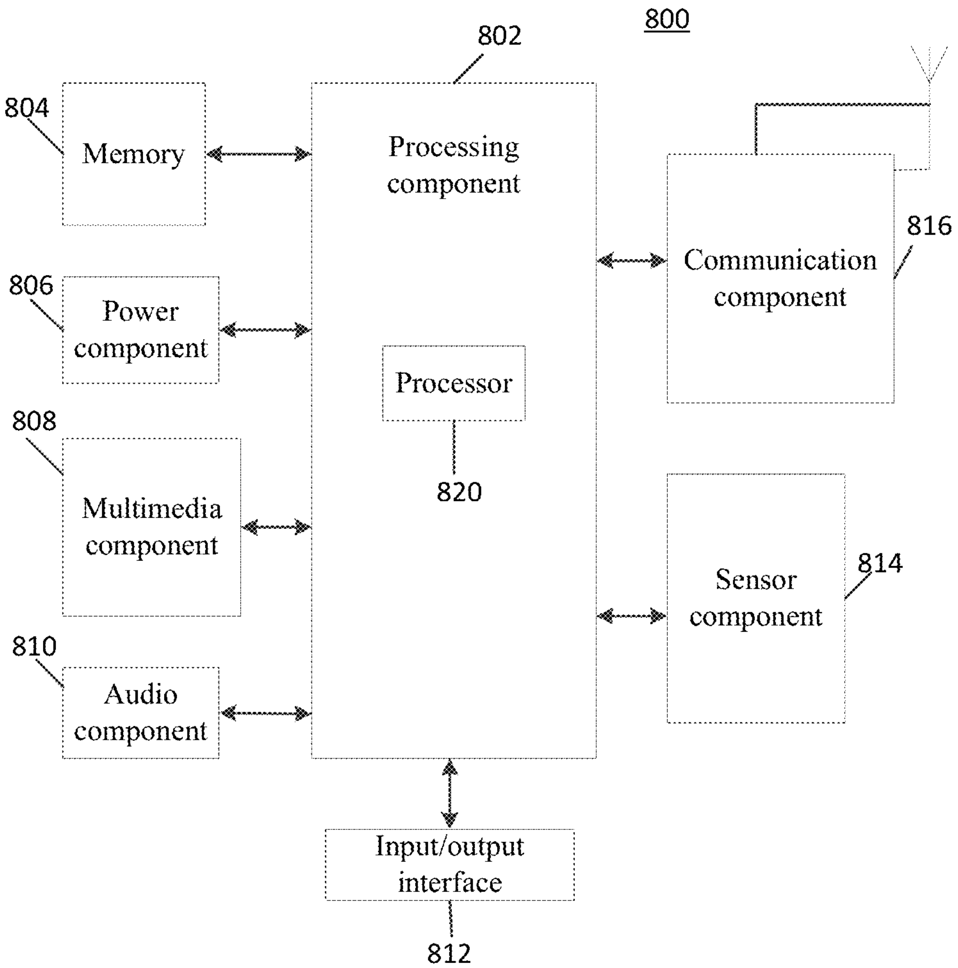
FIG. 21 is a schematic structural diagram of a terminal according to an example.

As shown in FIG. 21, an example of the disclosure provides a structure of a terminal.

FIG. 21 shows the terminal 800. The example provides the terminal 800, and the terminal may be a mobile phone, a computer, a digital broadcast terminal, a messaging apparatus, a gaming console, a tablet apparatus, a medical apparatus, a fitness apparatus, a personal digital assistant, etc.

With reference to FIG. 21, the terminal 800 may include one or more of a processing component 802, a memory 804, a power component 806, a multimedia component 808, an audio component 810, an input/output (I/O) interface 812, a sensor component 814, and a communication component 816.

The processing component 802 generally controls the overall operation of the terminal 800, for example, operations associated with display, phone calls, data communications, camera operations, and recording operations. The processing component 802 may include one or more processors 820 to execute an instruction to complete all or some of the steps of the method above. Moreover, the processing component 802 may include one or more modules to facilitate interaction between the processing component 802 and other components. For example, the processing component 802 may include the multimedia module to facilitate interaction between the multimedia component 808 and the processing component 802.

The memory 804 is configured to store various types of data to support operation on the equipment 800. Instances of such data include an instruction, operated on the terminal 800, for any application or method, contact data, phonebook data, messages, pictures, video, etc. The memory 804 may be implemented by any types of volatile or non-volatile memory devices, or their combinations, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 806 supplies power to the various assemblies of the terminal 800. The power component 806 may include a power management system, one or more power supplies, and other assemblies associated with power generation, management, and distribution for the terminal 800.

The multimedia component 808 includes a screen that provides an output interface between the terminal 800 and the user. In some examples, the screen may include a liquid crystal display (LCD) and a touch panel (TP). If the screen includes a touch panel, the screen may be implemented as a touch screen, so as to receive an input signal from a user. The touch panel includes one or more touch sensors to sense touches, slides, and gestures on the touch panel. The touch sensor may not only sense a boundary of a touch or swipe action, but also detect duration and pressure related to the touch or swipe operation. In some examples, the multimedia component 808 includes a front-facing camera and/or a rear-facing camera. When the device 800 is in an operational mode, for example, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio component 810 is configured to output and/or input audio signals. For example, the audio component 810 includes a microphone (MIC) configured to receive an external audio signal when the terminal 800 is in operational modes, such as a call mode, a recording mode, and a speech recognition mode. The received audio signal may be further stored in the memory 804 or transmitted via the communication component 816. In some examples, the audio component 810 further includes a speaker for outputting an audio signal.

The I/O interface 812 provides an interface between the processing component 802 and a peripheral interface module, which may be a keyboard, a click wheel, a button, etc. These buttons may include, but are not limited to, a home button, a volume button, a start button, and a lock button.

The sensor component 814 includes one or more sensors for providing state assessments of various aspects of the terminal 800. For example, the sensor component 814 may detect an on/off state of the device 800 and the relative positioning of the components. For example, the components are a display and a keypad of the terminal 800. The sensor component 814 may also detect a change in position of the terminal 800 or a component of the terminal 800, the presence or absence of contact between the user and the terminal 800, the orientation or acceleration/deceleration of the terminal 800, and temperature variation of the terminal 800. The sensor component 814 may include a proximity sensor configured to detect the presence of a nearby object in the absence of any physical contact. The sensor component 814 may also include a light sensor, for example, a complementary metal oxide semiconductor (CMOS) or charge-coupled device (CCD) image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate communication between the terminal 800 and other devices in a wired or radio mode. The terminal 800 may access a wireless network based on a communication standard, for example, Wi-Fi, 2G, or 3G, or their combinations. In an example, the communication component 816 receives a broadcast signal or broadcast-related information from an external broadcast management system by means of a broadcast channel. In an example, the communication component 816 also includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth (BT) technology, or other technologies.

In an example, the terminal 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for executing the method above.

In an example, a non-transitory computer-readable storage medium is further provided and includes instructions, for example, a memory 804 including instructions which are executable by a processor 820 of a terminal 800, to complete the methods above. For example, the non-transitory computer-readable storage medium may be a read-only memory (ROM), a random access memory (RAM), a compact disc read-only memory (CD-ROM), a magnetic tape, a floppy disk, an optical data storage apparatus, etc.

Figure 22:
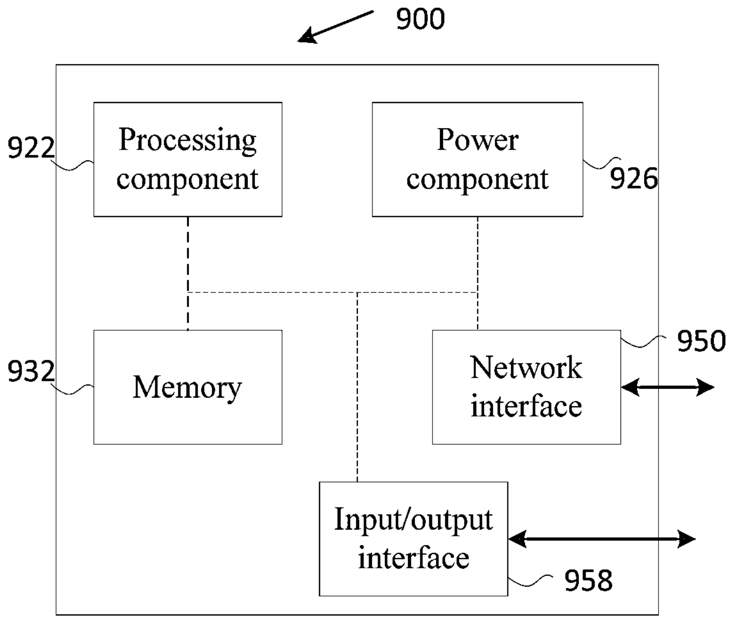
FIG. 22 is a block diagram of a base station according to an example.

As shown in FIG. 22, an example of the disclosure shows a structure of a base station. For example, the base station 900 may be provided as a network-side device. With reference to FIG. 22, the base station 900 includes a processing component 922, which includes one or more processors, and memory resources represented by a memory 932 for storing an instruction, for example, an application program, executable by the processing component 922. The application program stored in the memory 932 may include one or more modules, each of which corresponds to a set of instructions. Further, the processing component 922 is configured to execute the instructions to implement any of the methods described above as configured for the base station.

The base station 900 may further include a power component 926 configured to execute power supply management of the base station 900, a wired or radio network interface 950 configured to connect the base station 900 to a network, and an input/output (I/O) interface 958. The base station 900 may operate an operating system stored in the memory 932, for example, Windows Server™, Mac OS X™, Unix™, Linux™, FreeBSD™, etc.

According to a first aspect of examples of the disclosure, a method for transmitting a temporary reference signal is provided. The method is performed by a terminal, and includes determining a transmission resource configured to receive a third temporary reference signal (RS) according to a resource conflict result, where the resource conflict result includes a result that a conflict or no conflict occurs between a transmission resource determined based on a first temporary RS burst and an unavailable resource.

In an example, determining the transmission resource configured to receive the third temporary reference signal (RS) according to a resource conflict result includes: determining, in response to determining that no conflict occurs between the transmission resource determined based on the first temporary RS burst and the unavailable resource, that the transmission resource configured to receive the third temporary RS is the transmission resource determined based on the first temporary RS burst or determining, in response to determining that a conflict occurs between the transmission resource determined based on the first temporary RS burst and the unavailable resource, that the transmission resource configured to receive the third temporary RS is the transmission resource determined based on a second temporary RS burst, where the second temporary RS burst is a temporary RS burst determined according to the first temporary RS burst.

In an example, the second temporary RS burst is at least one of the following: a temporary RS burst determined after the first temporary RS burst is shifted by N time domain units in the time domain, where N is determined according to a number of time domain units and/or time domain position occupied by the unavailable resource; temporary RS bursts determined after at least two first temporary RS bursts are shifted by N time domain units in time domain, where a conflict occurs between the transmission resource determined by at least one of the first temporary RS bursts and the unavailable resource, and Nis determined according to a number of time domain units and/or time domain position occupied by the unavailable resource; a temporary RS burst determined after a temporary RS sample in the first temporary RS burst being in conflict with the unavailable resource is shifted by N time domain units in time domain, where N is determined according to a number of time domain units and/or time domain position occupied by the unavailable resource, and the temporary RS sample is a resource configured to transmit an RS; or a temporary RS burst determined after the first temporary RS burst is shifted by M frequency domain units in the frequency domain, where M is determined according to a number of frequency domain units and/or frequency domain position occupied by the unavailable resource.

In an example, the method further includes: stopping receiving the second temporary RS burst in response to determining that N is greater than a preset number threshold, and executing automatic gain control (AGC) adjustment and/or time-frequency domain tracking based on a system resource block (SSB); or executing, in response to determining that an SSB is received before the second temporary RS burst, automatic gain control (AGC) adjustment and/or time-frequency domain tracking based on the SSB.

In an example, the first temporary RS burst is at least one of the following: a temporary RS burst configured according to higher-layer signaling; a temporary RS burst determined according to received dynamic indication information sent by a network; a temporary RS burst configured according to higher-layer signaling and determined according to dynamic indication information sent by a network side; or a temporary RS burst determined according to default configuration information.

In an example, the unavailable resource includes one or more of the following: an uplink symbol resource for uplink transmission; an uplink slot resource for uplink transmission; a resource configured to transmit a cell-specific reference signal (CRS); a resource configured to transmit an SSB; or a reserved resource preconfigured by a network.

According to a second aspect of the disclosure, a method for transmitting a temporary reference signal is provided. The method is performed by a base station, and includes determining a transmission resource configured to send a third temporary RS according to a resource conflict result, where the resource conflict result includes a result that a conflict or no conflict occurs between the transmission resource determined based on a first temporary RS burst and an unavailable resource.

In an example, determining if the transmission resource is configured to send the third temporary RS according to a resource conflict result includes: determining, in response to determining that no conflict occurs between the transmission resource determined based on the first temporary RS burst and the unavailable resource, that the transmission resource configured to send the third temporary RS is the transmission resource determined based on the first temporary RS burst; or determining, in response to determining that a conflict occurs between the transmission resource determined based on the first temporary RS burst and the unavailable resource, that the transmission resource configured to send the third temporary RS is the transmission resource determined based on a second temporary RS burst, where the second temporary RS burst is a temporary RS burst determined according to the first temporary RS burst.

In an example, the second temporary RS burst is at least one of the following: a temporary RS burst determined after the first temporary RS burst is shifted by N time domain units in the time domain, where N is determined according to a number of time domain units and/or time domain position occupied by the unavailable resource; temporary RS bursts determined after at least two first temporary RS bursts are shifted by N time domain units in time domain, where a conflict occurs between the transmission resource determined by at least one of the first temporary RS bursts and the unavailable resource, and N is determined according to a number of time domain units and/or time domain position occupied by the unavailable resource; a temporary RS burst determined after a temporary RS sample in the first temporary RS burst being in conflict with the unavailable resource is shifted by N time domain units in time domain, where N is determined according to a number of time domain units and/or time domain position occupied by the unavailable resource, and the temporary RS sample is a resource configured to transmit an RS; or a temporary RS burst determined after the first temporary RS burst is shifted by M frequency domain units in the frequency domain, where M is determined according to a number of frequency domain units and/or frequency domain position occupied by the unavailable resource.

In an example, the method further includes sending information indicating the first temporary RS burst to a terminal.

In an example, the unavailable resource includes one or more of the following: an uplink symbol resource for uplink transmission; an uplink slot resource for uplink transmission; a resource configured to transmit a cell-specific reference signal (CRS); a resource configured to transmit an SSB; or a reserved resource preconfigured by a network.

In the example of the disclosure, a transmission resource configured to receive the third temporary reference signal (RS) is determined according to a resource conflict result, where the resource conflict result includes a result that a conflict or no conflict occurs between a transmission resource determined based on a first temporary RS burst and an unavailable resource. Here, since the transmission resource configured to receive a third temporary RS is determined according to a result that a conflict or no conflict occurs between a transmission resource determined based on a first temporary RS burst and an unavailable resource, the transmission resource configured to receive a temporary RS can be adapted to the resource conflict result. That is, when a conflict occurs, the transmission resource having the conflict does not have to be used. Compared with a manner of receiving a temporary RS by using a transmission resource in conflict with an unavailable resource, the disclosure can reduce conflicts with an unavailable resource, and the reliability of temporary RS transmission can be improved.

Those skilled in the art can readily conceive of other embodiments of the disclosure upon consideration of the specification and practice of the disclosure. The disclosure is intended to cover any variations, uses, or adaptive changes of the disclosure, and these variations, uses, or adaptive changes follow general principles of the disclosure and include common general knowledge or customary technical means in the technical field not disclosed in the disclosure. The specification and embodiments are considered as illustrative merely, and the true scope and spirit of the disclosure are indicated by the following claims.

It should be understood that the disclosure is not limited to the precise structure that has been described above and shown in the accompanying drawings and can be modified and altered in various ways without departing from its scope. The scope of the disclosure is limited only by the appended claims.

The invention claimed is:

1. A method for transmitting a temporary reference signal, performed by a terminal, comprising:

determining a transmission resource used for receiving a third temporary reference signal (RS) according to a resource conflict result, wherein the resource conflict result comprises a result that a conflict or no conflict occurs between a transmission resource determined based on a first temporary RS burst and an unavailable resource; and receiving the third temporary RS using the transmission resource used for receiving the third temporary RS, wherein the conflict comprises an overlap between the transmission resource determined based on the first temporary RS burst and the unavailable resource in at least one of a time domain or a frequency domain, and wherein the determining the transmission resource used for receiving the third temporary RS according to a resource conflict result comprises:

determining, on condition that no conflict occurs between the transmission resource determined based on the first temporary RS burst and the unavailable resource, that the transmission resource used for receiving the third temporary RS is the transmission resource determined based on the first temporary RS burst, or determining, on condition that a conflict occurs between the transmission resource determined based on the first temporary RS burst and the unavailable resource, that the transmission resource used for receiving the third temporary RS is the transmission resource determined based on a second temporary RS burst, wherein the second temporary RS burst is a temporary RS burst determined according to the first temporary RS burst.

2. The method according to claim 1, wherein the second temporary RS burst is at least one of:

a temporary RS burst determined after the first temporary RS burst is shifted by N time domain units in time domain, wherein N is determined according to at least one of a number of time domain units or a number of time domain position occupied by the unavailable resource;

temporary RS bursts determined after at least two first temporary RS bursts are shifted by N time domain units in time domain, wherein a conflict occurs between the transmission resource determined by at least one of the first temporary RS bursts and the unavailable resource, and N is determined according to at least one of a number of time domain units or a number of time domain position occupied by the unavailable resource;

a temporary RS burst determined after a temporary RS sample in the first temporary RS burst being in conflict with the unavailable resource is shifted by N time domain units in time domain, wherein N is determined according to at least one of a number of time domain units or a number of time domain position occupied by the unavailable resource, and the temporary RS sample is a resource configured to transmit an RS; or a temporary RS burst determined after the first temporary RS burst is shifted by M frequency domain units in frequency domain, wherein M is determined according to at least one of a number of frequency domain units or a number of frequency domain position occupied by the unavailable resource, and wherein a time domain unit includes a slot or an orthogonal frequency division multiplexing (OFDM) symbol.

3. The method according to claim 2, further comprising:

stopping receiving the second temporary RS burst on condition that N is greater than a preset number threshold, and executing at least one of automatic gain control (AGC) adjustment or time-frequency domain tracking based on a system resource block (SSB); or executing, on condition that an SSB is received before the second temporary RS burst, at least one of automatic gain control (AGC) adjustment or time-frequency domain tracking based on the SSB.

4. The method according to claim 2, wherein

N is greater than a first value in a case where the number of time domain units occupied by the unavailable resource is greater than or equal to a number threshold; or N is less than a second value in a case where the number of time domain units occupied by the unavailable resource is less than or equal to a number threshold; or M is greater than a first value in a case where the number of frequency domain units occupied by the unavailable resource is greater than or equal to a number threshold; or M is less than a second value in a case where the number of frequency domain units occupied by the unavailable resource is less than or equal to a number threshold.

5. The method according to claim 1, wherein the first temporary RS burst is at least one of:

a temporary RS burst configured according to higher-layer signaling;

a temporary RS burst determined according to received dynamic indication information sent by a network;

a temporary RS burst configured according to higher-layer signaling and determined according to dynamic indication information sent by a network side; or a temporary RS burst determined according to default configuration information.

6. The method according to claim 1, wherein the unavailable resource comprises at least one of:

an uplink symbol resource for uplink transmission;

an uplink slot resource for uplink transmission;

a resource configured to transmit a cell-specific reference signal (CRS);

a resource configured to transmit an SSB; or a reserved resource preconfigured by a network.

7. A non-transitory computer storage medium, storing a computer-executable instruction, wherein the computer-executable instruction when executed by a processor cause the processor to execute the method according to claim 1.

8. A method for transmitting a temporary reference signal, performed by a base station, comprising:

determining a transmission resource used for sending a third temporary RS according to a resource conflict result, wherein the resource conflict result comprises a result that a conflict or no conflict occurs between a transmission resource determined based on a first temporary RS burst and an unavailable resource; and sending the third temporary RS using the transmission resource used for sending the third temporary RS, wherein the conflict comprises an overlap between the transmission resource determined based on the first temporary RS burst and the unavailable resource in at least one of a time domain or a frequency domain, and wherein the determining the transmission resource used for sending the third temporary RS according to a resource conflict result comprises:

determining, on condition that no conflict occurs between the transmission resource determined based on the first temporary RS burst and the unavailable resource, that the transmission resource used for sending the third temporary RS is the transmission resource determined based on the first temporary RS burst, or determining, on condition that a conflict occurs between the transmission resource determined based on the first temporary RS burst and the unavailable resource, that the transmission resource used for sending the third temporary RS is the transmission resource determined based on a second temporary RS burst, wherein the second temporary RS burst is a temporary RS burst determined according to the first temporary RS burst.

9. The method according to claim 8, wherein the second temporary RS burst is at least one of:

a temporary RS burst determined after the first temporary RS burst is shifted by N time domain units in time domain, wherein N is determined according to at least one of a number of time domain units or a number of time domain position occupied by the unavailable resource;

temporary RS bursts determined after at least two first temporary RS bursts are shifted by N time domain units in time domain, wherein a conflict occurs between the transmission resource determined by at least one of the first temporary RS bursts and the unavailable resource, and N is determined according to at least one of a number of time domain units or a number of time domain position occupied by the unavailable resource;

a temporary RS burst determined after a temporary RS sample in the first temporary RS burst being in conflict with the unavailable resource is shifted by N time domain units in time domain, wherein N is determined according to at least one of a number of time domain units or a number of time domain position occupied by the unavailable resource, and the temporary RS sample is a resource configured to transmit an RS; or a temporary RS burst determined after the first temporary RS burst is shifted by M frequency domain units in frequency domain, wherein M is determined according to at least one of a number of frequency domain units or a number of frequency domain position occupied by the unavailable resource, and wherein a time domain unit includes a slot or an orthogonal frequency division multiplexing (OFDM) symbol.

10. The method according to claim 9, wherein

N is greater than a first value in a case where the number of time domain units occupied by the unavailable resource is greater than or equal to a number threshold; or N is less than a second value in a case where the number of time domain units occupied by the unavailable resource is less than or equal to a number threshold; or M is greater than a first value in a case where the number of frequency domain units occupied by the unavailable resource is greater than or equal to a number threshold; or M is less than a second value in a case where the number of frequency domain units occupied by the unavailable resource is less than or equal to a number threshold.

11. The method according to claim 8, further comprising: sending information indicating the first temporary RS burst to a terminal.

12. The method according to claim 8, wherein the unavailable resource comprises at least one of:

an uplink symbol resource for uplink transmission;

an uplink slot resource for uplink transmission;

a resource configured to transmit a cell-specific reference signal (CRS);

a resource configured to transmit an SSB; or a reserved resource preconfigured by a network.

13. A communication device, comprising:

a memory; and a processor communicatively coupled to the memory, wherein the processor is configured to implement the method according to claim 8.

14. A non-transitory computer storage medium, storing a computer-executable instruction, wherein the computer-executable instruction when executed by a processor cause the processor to execute the method according to claim 8.

15. A communication device, comprising:

a memory; and a processor communicatively coupled to the memory, and the processor is configured to:

determine a transmission resource used for receiving a third temporary reference signal (RS) according to a resource conflict result, wherein the resource conflict result comprises a result that a conflict or no conflict occurs between a transmission resource determined based on a first temporary RS burst and an unavailable resource, receive the third temporary RS using the transmission resource used for receiving the third temporary, wherein the conflict comprises an overlap between the transmission resource determined based on the first temporary RS burst and the unavailable resource in at least one of a time domain or a frequency domain, and wherein the processor is further configured to:

determine, on condition that no conflict occurs between the transmission resource determined based on the first temporary RS burst and the unavailable resource, that the transmission resource used for receiving the third temporary RS is the transmission resource determined based on the first temporary RS burst, or determine, on condition that a conflict occurs between the transmission resource determined based on the first temporary RS burst and the unavailable resource, that the transmission resource used for receiving the third temporary RS is the transmission resource determined based on a second temporary RS burst, wherein the second temporary RS burst is a temporary RS burst determined according to the first temporary RS burst.

16. The communication device according to claim 15, wherein the second temporary RS burst is at least one of:

a temporary RS burst determined after the first temporary RS burst is shifted by N time domain units in time domain, wherein N is determined according to at least one of a number of time domain units or a number of time domain position occupied by the unavailable resource;

temporary RS bursts determined after at least two first temporary RS bursts are shifted by N time domain units in time domain, wherein a conflict occurs between the transmission resource determined by at least one of the first temporary RS bursts and the unavailable resource, and N is determined according to at least one of a number of time domain units or a number of time domain position occupied by the unavailable resource;

a temporary RS burst determined after a temporary RS sample in the first temporary RS burst being in conflict with the unavailable resource is shifted by N time domain units in time domain, wherein N is determined according to at least one of a number of time domain units or a number of time domain position occupied by the unavailable resource, and the temporary RS sample is a resource configured to transmit an RS; or a temporary RS burst determined after the first temporary RS burst is shifted by M frequency domain units in frequency domain, wherein M is determined according to at least one of a number of frequency domain units or a number of frequency domain position occupied by the unavailable resource, and wherein a time domain unit includes a slot or an orthogonal frequency division multiplexing (OFDM) symbol.

17. The communication device according to claim 16, the processor is further configured to:

stop receiving the second temporary RS burst on condition that N is greater than a preset number threshold, and executing at least one of automatic gain control (AGC) adjustment or time-frequency domain tracking based on a system resource block (SSB); or execute, on condition that an SSB is received before the second temporary RS burst, at least one of automatic gain control (AGC) adjustment or time-frequency domain tracking based on the SSB.

18. The communication device according to claim 16, wherein

N is greater than a first value in a case where the number of time domain units occupied by the unavailable resource is greater than or equal to a number threshold; or N is less than a second value in a case where the number of time domain units occupied by the unavailable resource is less than or equal to a number threshold; or M is greater than a first value in a case where the number of frequency domain units occupied by the unavailable resource is greater than or equal to a number threshold; or M is less than a second value in a case where the number of frequency domain units occupied by the unavailable resource is less than or equal to a number threshold.

19. The communication device according to claim 15, wherein the first temporary RS burst is at least one of:

a temporary RS burst configured according to higher-layer signaling;

a temporary RS burst determined according to received dynamic indication information sent by a network;

a temporary RS burst configured according to higher-layer signaling and determined according to dynamic indication information sent by a network side; and a temporary RS burst determined according to default configuration information.

20. The communication device according to claim 15, wherein the unavailable resource comprises at least one of:

an uplink symbol resource for uplink transmission;

an uplink slot resource for uplink transmission;

a resource configured to transmit a cell-specific reference signal (CRS);

a resource configured to transmit an SSB; or a reserved resource preconfigured by a network.

* * * * *